United States Patent
Schang et al.

(10) Patent No.: US 8,396,637 B2
(45) Date of Patent: Mar. 12, 2013

(54) SYSTEM AND METHOD FOR AUTOMATIC TRANSMISSION SHIFT CONTROL

(75) Inventors: Mark A. Schang, Milford, MI (US);
Matthew D. Whitton, Howell, MI (US)

(73) Assignee: GM Global Technology Operations LLC

( * ) Notice: Subject to any disclaimer, the term of this patent is extended or adjusted under 35 U.S.C. 154(b) by 321 days.

(21) Appl. No.: 12/877,332

(22) Filed: Sep. 8, 2010

(65) Prior Publication Data

US 2011/0251766 A1   Oct. 13, 2011

Related U.S. Application Data

(60) Provisional application No. 61/321,737, filed on Apr. 7, 2010.

(51) Int. Cl.
*B60W 10/02* (2006.01)
*F16D 48/06* (2006.01)

(52) U.S. Cl. ............................. 701/67; 477/166; 701/55

(58) Field of Classification Search .................... 701/67, 701/51–55; 477/34–36, 174, 166–168, 70, 477/179–181
See application file for complete search history.

(56) References Cited

U.S. PATENT DOCUMENTS

| | | | |
|---|---|---|---|
| 6,285,942 B1 | 9/2001 | Steinmetz et al. | |
| 7,212,898 B2 * | 5/2007 | Whitton et al. | 701/51 |
| 8,214,116 B2 * | 7/2012 | Whitton | 701/55 |
| 2006/0089775 A1 | 4/2006 | Whitton et al. | |

* cited by examiner

*Primary Examiner* — Yonel Beaulieu

(57) ABSTRACT

A control system for an automatic transmission coupled to an engine by a torque converter includes a torque module and a first clutch control module. The torque module determines an input torque to the transmission based on an output torque of the engine. The first clutch control module adjusts an acceleration of a turbine of the torque converter during a down shift of the transmission based on the input torque. The first clutch control module adjusts the acceleration of the turbine by adjusting a first pressure of fluid supplied to an off-going clutch of the transmission based on the input torque. The first clutch control module adjusts the first pressure based on a mathematical model that relates a torque capacity of the off-going clutch, the input torque, and the acceleration. A method is also provided.

18 Claims, 11 Drawing Sheets

SYSTEM AND METHOD FOR AUTOMATIC TRANSMISSION SHIFT CONTROL

CROSS-REFERENCE TO RELATED APPLICATIONS

This application claims the benefit of U.S. Provisional Application No. 61/321,737, filed on Apr. 7, 2010. The disclosure of the above application is incorporated herein by reference in its entirety.

FIELD

The present disclosure relates to systems and methods for automatic transmission shift control, and more particularly, to systems and methods for controlling fluid pressures supplied to hydraulically-actuated clutches used to shift between gear ratios of the transmission.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Vehicles may include a powerplant and an automatic transmission that transmits drive torque at various gear ratios or ranges to a drivetrain. The powertrain may be coupled to the transmission by a torque converter. The transmission may include a gear train that transmits drive torque transmitted by the torque converter at the various gear ratios or ranges. The transmission may further include friction elements, such as clutches, for effecting gear ratio changes during a shift operation. The clutches may be hydraulically actuated and may be controlled by a hydraulic control system.

The shift operation between one or more gear ratios may be one of an up shift or a down shift. The shift operation may further be defined as a power-on shift or a power-off shift. A power-on shift may refer to a shift operation while an accelerator pedal is depressed, while a power-off shift may refer to a shift operation while the accelerator is not depressed.

Transmission control systems have been developed to control fluid pressures supplied by the hydraulic control system to the clutches during shift operations. However, the control systems may decrease the drive torque output by the powerplant to improve shift feel. Decreases in the drive torque can introduce delays in the shift operation and can result in an undesirable sag in drive torque that is perceived by the driver.

SUMMARY

In one form, the present disclosure provides a control system for an automatic transmission coupled to an engine by a torque converter. The control system includes a torque module and a first clutch control module. The torque module determines an input torque to the transmission based on an output torque of the engine. The first clutch control module adjusts an acceleration of a turbine of the torque converter during a down shift of the transmission based on the input torque. The first clutch control module adjusts the acceleration of the turbine by adjusting a first pressure of fluid supplied to an off-going clutch of the transmission based on the input torque.

In one feature, the first clutch control module decelerates the turbine by increasing the first pressure. In another feature, the first clutch control module adjusts the first pressure based on a mathematical model that relates a torque capacity of the off-going clutch, the input torque, and the acceleration. In a related feature, the mathematical model is embodied in one of an equation and a lookup table stored in a memory module.

In yet another feature, the input torque may be a compensated input torque based on at least one of an engine speed, a turbine speed, and a torque ratio of the torque converter.

In still further features, the control system may further include a stage module that begins a first control stage and a second control stage. The stage module begins the first control stage in response to a request for the down shift. The stage module ends the first control stage when one of off-going clutch slip is detected and an elapsed time of the first control stage is greater than a predetermined first period. The stage module begins the second control stage at an end of the first control stage. In a related feature, the first clutch control module may initiate the off-going clutch slip during the first control stage by decreasing the first pressure. The first clutch control module further adjusts the first pressure during the second control stage based on the input torque. In another related feature, the first clutch control module may limit a rate of change in the first pressure during the first control stage.

In yet further features, when turbine speed stall is detected while the first clutch control module is adjusting the acceleration, the first clutch control module steps the first pressure down by a predetermined pressure. In a related feature, the first clutch control module decreases the first pressure at a predetermined pressure rate after stepping the first pressure down. In another related feature, the first clutch control module may, after decreasing the first pressure at the predetermined pressure rate, step the first pressure up to a measured pressure of the fluid at a time when the turbine speed stall was detected.

In still other features, the control system may further include a second clutch module that increases a rate at which a second pressure of fluid supplied to an on-coming clutch is increased during the down shift. In a related feature, the second clutch control module increases the rate from a predetermined first rate to a predetermined second rate greater than the predetermined first rate. The predetermined first rate is based on the input torque. In another related feature, the second clutch control module may adjust the rate by a predetermined amount when turbine flare is detected.

In another form, the present disclosure provides a method for an automatic transmission coupled to an engine by a torque converter. The method includes determining an input torque to the transmission based on an output torque of the engine. The method further includes adjusting an acceleration of a turbine of the torque converter during a down shift of the transmission by adjusting a first pressure of fluid supplied to an off-going clutch of the transmission based on the input torque.

In one feature, the adjusting the acceleration includes decelerating the turbine by increasing the first pressure. In another feature, the adjusting the acceleration includes adjusting the first pressure based on a mathematical model. The mathematical model relates a torque capacity of the off-going clutch, the input torque, and the acceleration. In a related feature, the mathematical model is embodied in one of an equation and a lookup table stored in a memory module.

In yet another feature, the input torque may be a compensated input torque based on at least one of an engine speed, a turbine speed, and a torque ratio of the torque converter.

In still further features, the method further includes beginning a first control stage in response to a request for the down shift and initiating off-going clutch slip during the first control stage by decreasing the first pressure. The method further includes ending the first control stage when one of the off-going clutch slip is detected and an elapsed time of the first control stage is greater than a predetermined first period. The method further includes beginning a second control stage at an end of the first control stage. In a related feature, the adjusting the acceleration is performed during the second control stage. In another related feature, the initiating the off-going clutch slip may include limiting a rate of change in the first pressure.

In yet further features, the adjusting the acceleration may include stepping the first pressure down by a predetermined pressure when turbine speed stall is detected, and decreasing the first pressure at a predetermined pressure rate after the stepping the first pressure down. In a related feature, the adjusting the acceleration may further include stepping the first pressure up to a measured pressure of the fluid at a time when the turbine speed stall was detected after the decreasing the first pressure.

In still other features, the method may further include increasing a second pressure of fluid supplied to an on-coming clutch during the down shift. In a related feature, the increasing the second pressure includes increasing a rate at which the second pressure is increased from a predetermined first rate to a predetermined second rate greater than the predetermined first rate. The predetermined first rate is based on the input torque. In another related feature, the increasing the second pressure may further include adjusting the rate by a predetermined amount when turbine flare is detected.

In still other features, the systems and methods described above are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
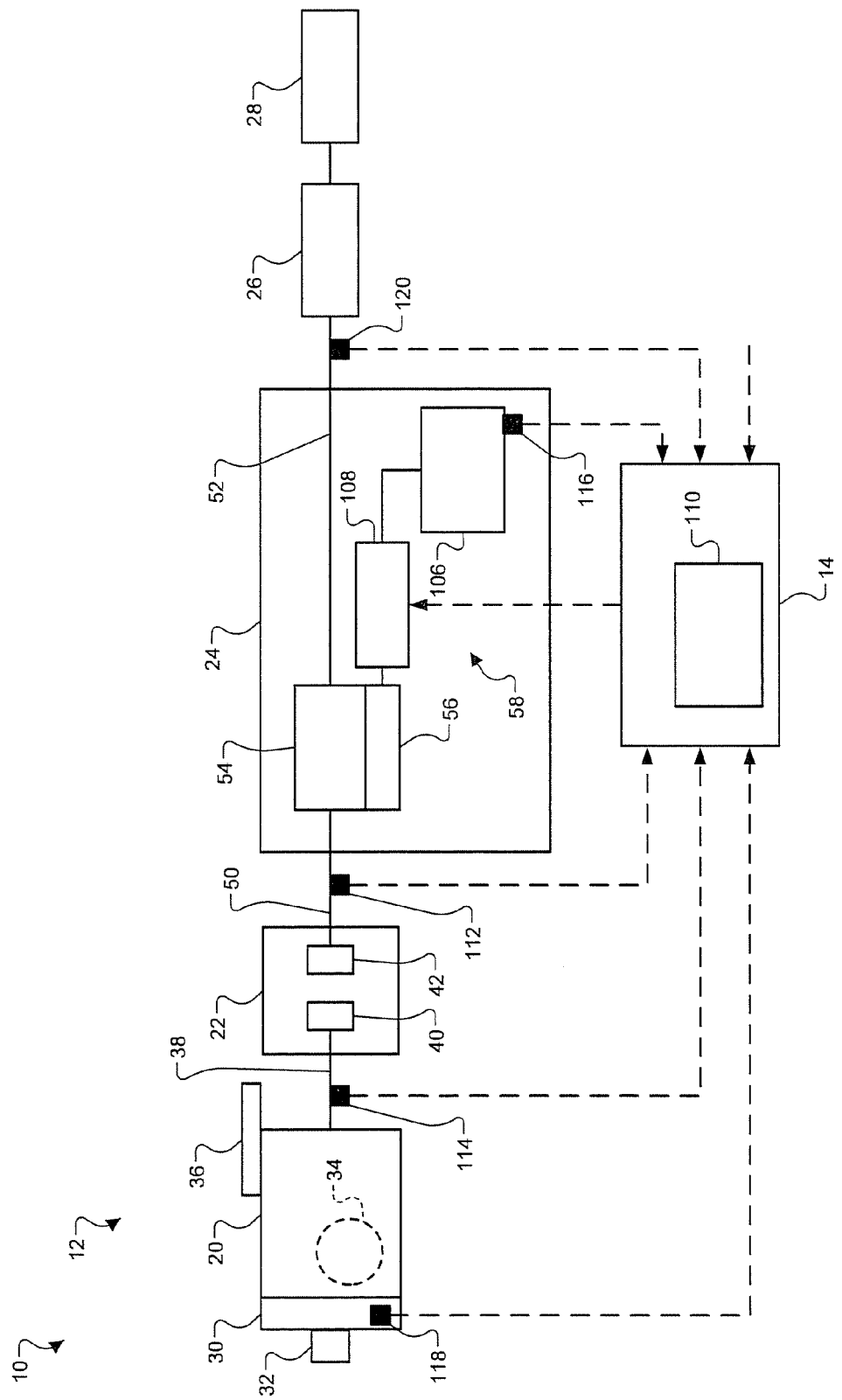
FIG. 1 is a functional block diagram of an exemplary vehicle system according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

With particular reference to FIG. 1, an exemplary vehicle system 10 for a vehicle according to the present disclosure is presented. The vehicle system 10 includes a powertrain 12 controlled by a control module 14. The vehicle system 10 further includes various sensors, discussed below, that measure various operating conditions used by the control module 14 to control operation. The powertrain 12 includes a powerplant including an engine 20, a torque converter (TC) 22, a transmission 24, a driveline 26, and one or more driven wheels 28. The powerplant produces drive torque that is transmitted through the TC 22 to the transmission 24. The transmission 24 transmits the drive torque to the driveline 26 at various gear ratios to drive the wheels 28.

The engine 20 includes an intake system 30 including a throttle 32, one or more cylinders 34, an exhaust system 36, and a crankshaft 38. Air is drawn into the cylinders 34 through the intake system 30 and combusted in an air-and-fuel (A/F) mixture. Combustion of the A/F mixture drives pistons (not shown), which drive rotation of the crankshaft 38 and thereby produce drive torque. The crankshaft 38 is coupled to and drives rotation of the TC 22. Exhaust gases produced during combustion are expelled through the exhaust system 36.

The TC 22 includes a pump 40, a turbine 42, and a stator (not shown). The pump 40 is drivingly coupled to the crankshaft 38. The turbine 42 is fluidly coupled with the pump 40 and is coupled to and drives rotation of the transmission 24. The stator is disposed between the pump 40 and the turbine 42 and may be used to vary the torque transmitted through the TC 22, which may be referred to as a TC torque ratio.

Figure 2:
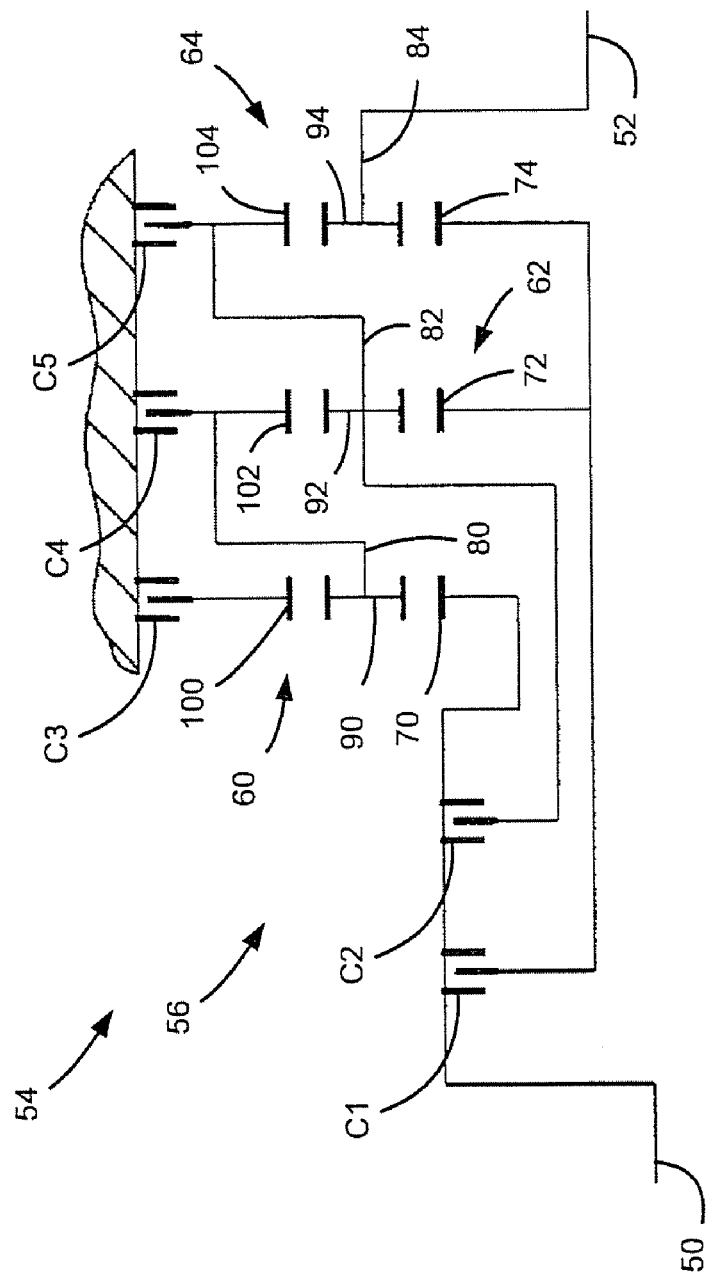
FIG. 2 is a schematic diagram of a portion of the transmission shown in FIG. 1.

The transmission 24 includes an input shaft 50, an output shaft 52, a gear train 54, friction elements 56, and a hydraulic control system 58. The input shaft 50 drivingly couples the turbine 42 with the gear train 54. The output shaft 52 drivingly couples the gear train 54 and the driveline 26. The gear train 54 transmits torque transmitted by the TC 22 to the output shaft 52 at one or more gear ratios. With additional reference to FIG. 2, an exemplary implementation of the gear train 54 includes three inter-connected planetary gear sets 60, 62, 64. The planetary gear sets 60, 62, 64 include respective sun gears 70, 72, 74, carriers 80, 82, 84, planetary gears 90, 92, 94, and ring gears 100, 102, 104. In the present example, the friction elements 56 include clutches C1, C2, C3, C4, C5 selectively engageable to establish a desired gear ratio of the transmission 24. For clarity, the friction elements 56 will be referred to below and in the figures as clutches 56 with the understanding that they may be used interchangeably.

In the present example, the input shaft 50 continuously drives the sun gear 70 of the planetary gear set 60. The input shaft 50 selectively drives the sun gears 72, 74 of the planetary gear sets 62, 64 via the clutch C1 and selectively drives the carrier 82 of the planetary gear set 62 via the clutch C2. The ring gears 100, 102, 104 are selectively grounded via clutches C3, C4, and C5, respectively. The clutches C1 C2, C3, C4, C5 are selectively engaged to provide six forward gear ratios (1, 2, 3, 4, 5, 6), a reverse gear ratio (R), and a neutral condition (N). The Table below summarizes the state of engagement for each of the clutches C1-C5 for establishing each of the gear ratios and the neutral condition.

|   | C1 | C2 | C3 | C4 | C5 |
|---|----|----|----|----|----|
| 1 | X  |    |    |    | X  |
| 2 | X  |    |    | X  |    |
| 3 | X  |    | X  |    |    |
| 4 | X  | X  |    |    |    |
| 5 |    | X  | X  |    |    |
| 6 |    | X  |    | X  |    |
| R |    |    | X  |    | X  |
| N |    |    |    |    | X  |

With reference to the above table, the second forward speed ratio is established when clutches C1 and C4 are engaged and clutches C2, C3, C5 are not engaged. Shifting between one gear ratio and another may generally be achieved by disengaging one or more engaged clutches, referred to as off-going clutches, while engaging one or more disengaged clutches, referred to as on-coming clutches. As one example, the transmission 24 may be down shifted from sixth gear to fifth gear by disengaging clutch C4 while engaging clutch C5. In the example, clutch C4 is the off-going clutch and clutch C5 is the on-coming clutch.

Referring again to FIG. 1, the hydraulic control system 58 controls operation of the various components of the transmission 24, including the TC 22 and the gear train 54. For purposes of the present disclosure, the hydraulic control system 58 controls operation of the clutches 56 and includes a hydraulic pressure source 106 and a hydraulic circuit 108. The hydraulic pressure source 106 supplies hydraulic fluid at a first pressure to the hydraulic circuit 108. The first pressure supplied to the hydraulic circuit 108 may be referred to as a line pressure.

The hydraulic circuit 108 selectively supplies the hydraulic fluid to the clutches 56 at second pressures based on pressure commands received from the control module 14. The second pressures may be referred to as clutch control pressures. Although not shown, it will be appreciated that the hydraulic circuit 108 may include electro-mechanical actuators such as solenoids and hydraulic elements such as poppet valves, check valves, and the like, for controlling the clutch control pressures. The hydraulic circuit 108 controls the clutch control pressures by selectively supplying fluid to or discharging fluid from apply chambers of the clutches 56.

The control module 14 controls operation based on driver inputs received from various driver interface devices (not shown) and vehicle inputs received from various sensors that sense one or more operating conditions of the vehicle system 10. The driver interface devices may include an accelerator pedal used by the driver to convey a desired drive torque and a transmission range selector used by the driver to convey a desired range or gear ratio of the transmission 24.

According to the present disclosure, the control module 14 includes a shift control module 110 that controls clutch control pressures for off-going and on-coming clutches during commanded power-on down shifts. The shift control module 110 controls the clutch control pressures by outputting timed control signals to the hydraulic circuit 108 indicative of a desired off-going clutch control pressure and a desired on-coming clutch control pressure.

The shift control module 110 periodically determines the desired control pressures during commanded down shifts and outputs the timed control signals to communicate the current desired control pressures. The desired control pressures may be updated every predetermined control loop period. In an exemplary implementation, the predetermined control loop period may be twenty-five (25) milliseconds (msec).

As discussed in more detail below, the shift control module 110 controls the off-going and on-coming clutch control pressures based on various operating conditions and control parameters. The operating conditions include turbine speed, transmission input torque, transmission temperature, ambient pressure, and gear slip. In various implementations, the transmission input torque may be a compensated input torque.

Turbine speed is a rotational speed of the turbine 42. Turbine speed may be determined based on a rotational speed of the input shaft 50 (input shaft speed). A first speed sensor 112 may measure the rotational speed of the input shaft 50 and output a signal based on the measured rotational speed.

Transmission input torque is an estimate of the actual input torque transmitted to the input shaft 50. The transmission input torque may be based on the estimated engine torque output. Compensated input torque accounts for inertial effects associated with the engine 20 and the TC 22 and torque multiplication by the TC 22. Accordingly, the compensated input torque may be based on the estimated engine torque output, the engine speed, and the TC torque ratio. The engine speed may be determined based on a rotational speed of the crankshaft 38. A second speed sensor 114 may sense the rotational speed of the crankshaft 38 and output a signal based on the measured rotational speed.

Transmission temperature is an estimate of the temperature of the fluid within the apply chambers of the clutches 56. The transmission temperature may be determined based on a temperature of the fluid supplied by the hydraulic pressure source 106. A temperature sensor 116 may sense the temperature of the fluid and may output a signal based on the fluid temperature sensed.

Ambient air pressure is an estimate of the absolute pressure of the ambient air. The ambient pressure may be measured directly by a sensor that senses the ambient pressure. Alternately, the ambient pressure may be estimated based on one or more measured engine operating conditions, including intake air mass airflow (MAF) and temperature, manifold air pressure (MAP), and throttle position. MAF, MAP, and throttle position may be measured by one or more sensors located in the intake system 30. For simplicity, a single intake sensor 118 for measuring the foregoing operating conditions is shown. The intake sensor 118 outputs a signal indicative of the ambient air pressure.

Gear slip is a measure of a difference between an expected rotational speed of the output shaft 52 (output shaft speed) and an actual or measured output shaft speed. Gear slip may also be a measure of a difference between an expected turbine speed at the ending gear ratio and the actual or measured turbine speed. Positive gear slip occurs when the actual turbine speed is greater than the expected turbine speed. The expected turbine speed may be calculated by multiplying the output shaft speed by the ending gear ratio. A third speed sensor 120 may measure the rotational speed of the output shaft 52.

Figure 3:
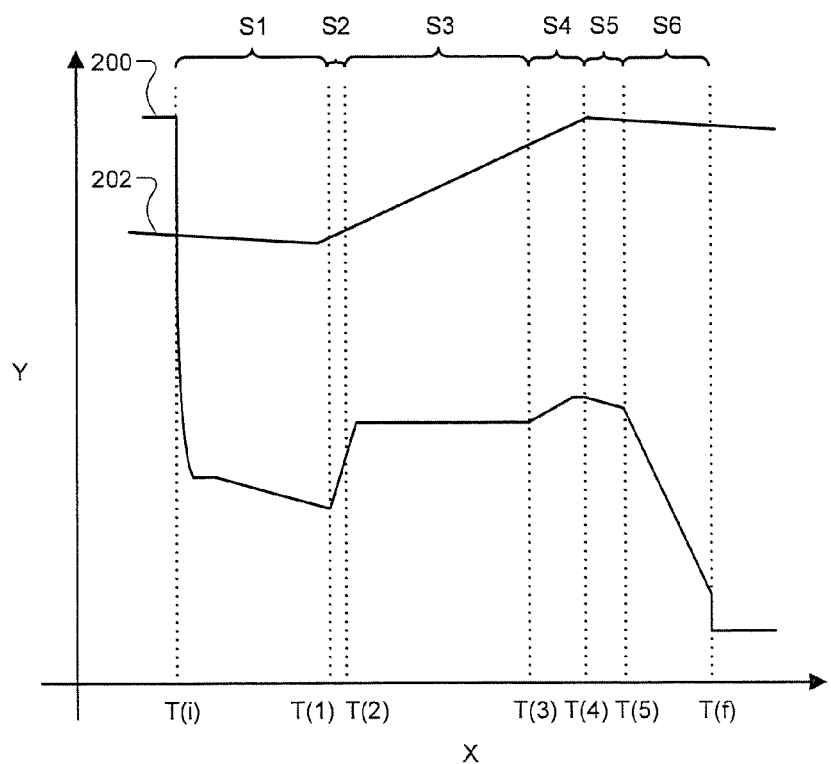
FIGS. 3-11 are plots of pressure versus time illustrating off-going clutch control and on-coming clutch control during a shift operation according to the present disclosure.
Figure 4:
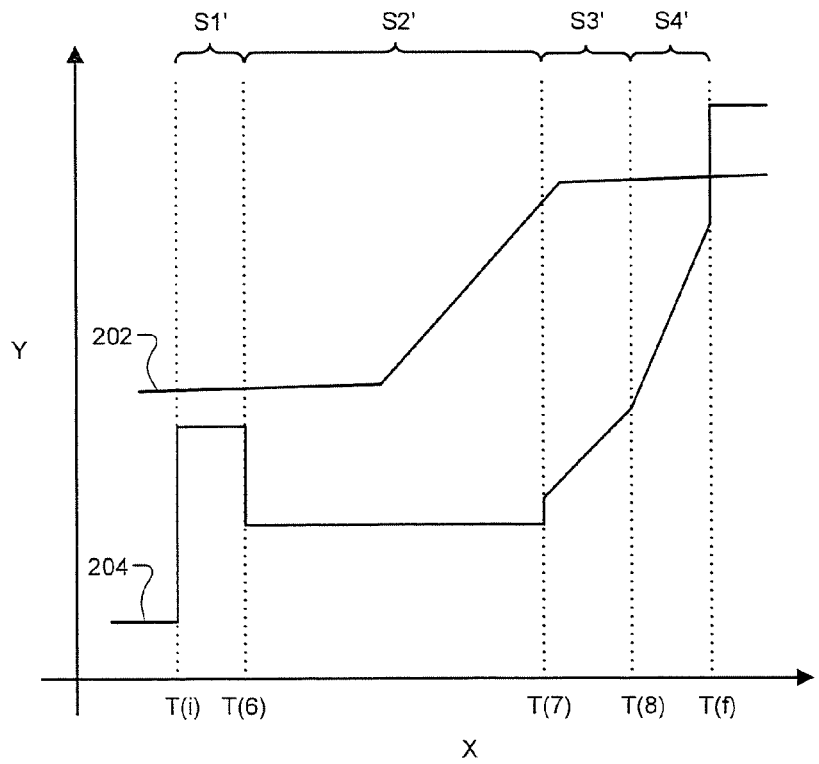

With initial reference to FIGS. 3-4, control of the off-going and on-coming clutches by the shift control module 110 according to the present disclosure will be described. FIG. 3 and FIG. 4 are charts illustrating off-going clutch (OGC) control and on-coming clutch (OCC) control, respectively, according to the present disclosure. FIG. 3 includes a first plot of the commanded OGC control pressure (y-axis) versus time (x-axis). FIG. 3 also includes a second plot of turbine speed (y-axis) versus time (x-axis). The commanded OGC control pressure is designated by reference numeral 200, while the turbine speed is designated by reference numeral 202. FIG. 4 includes a first plot of the commanded OCC control pressure (y-axis) versus time (x-axis) and the second plot of turbine speed 202 of FIG. 3. The commanded OCC control pressure is designated by reference numeral 204.

OGC control and OCC control both begin at time T(i), when a power-on down shift is commanded and end at time T(f) when the transmission 24 has completed the down shift from the initial gear ratio to the final gear ratio.

Figure 8:
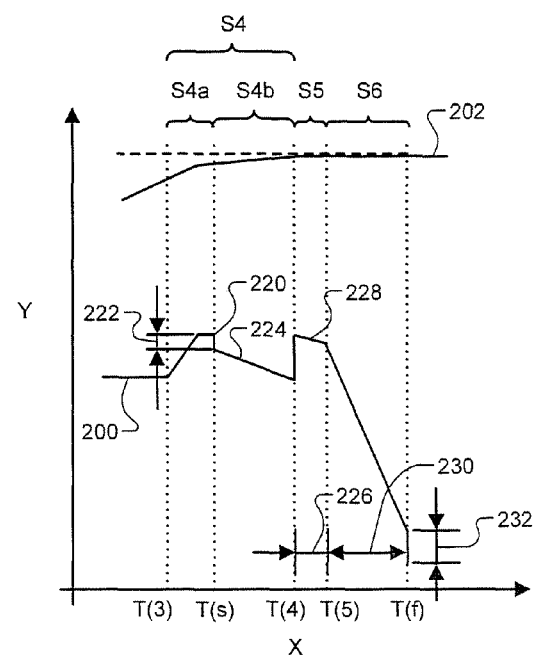

With particular reference to FIG. 3, OGC control may include various stages. Entry into and exit from the various stages may be event based and/or time based, as discussed in further detail below. In the present example, off-going clutch control includes an initial off-going clutch ramp down stage (OGC stage S1), an OGC step pressure stage (OGC stage S2), an OGC slip control stage (OGC stage S3), an OGC near synchronization boost stage (OGC stage S4), an OGC near synchronization hold stage (OGC stage S5), and an OGC torque phase ramp out stage (OGC stage S6). Stage S4, the near synchronization boost stage, may include a near synchronization ramp in stage (OGC stage S4a) and a near synchronization ramp out stage (OGC stage S4b) as illustrated in FIG. 8.

With particular reference to FIG. 4, OCC control may include various stages. Entry into and exit from the various stages may be event based and/or time based. In the present example, the on-coming clutch control includes an OCC chamber fill stage (OCC stage S1'), an OCC clutch staging stage (OCC stage S2'), an OCC slow ramp stage (OCC stage S3'), and an OCC quick lock-up stage (OCC stage S4').

With additional reference to FIGS. 5-9, OGC control according to the present disclosure will be described in further detail. OGC control begins in OGC stage S1, the initial OGC ramp down stage. OGC stage S1 begins at time T(i) when the power-on down shift is commanded and ends at time T(1) when OGC stage S1 exit criteria are met. Generally, during OGC stage S1, the commanded OGC control pressure is reduced to initiate off-going clutch slip. According to the present disclosure, loop-to-loop pressure changes may be limited to provide a damping functionality that reduces pressure "ringing" due to system dynamics.

During OGC stage S1, the commanded OGC control pressure includes an estimated pressure required to initiate off-going clutch slip. The commanded OGC control pressure further includes a plurality of pressure offsets and other control mechanisms for initiating off-going clutch slip. In an exemplary implementation, the commanded OGC control pressure (VeCCEC_p_PriOffgCmd[S1]) during OGC stage S1 is determined according to the following equation:

$$VeCCEC\_p\_PriOffgCmd[S1] = \qquad (1)$$
$$VeCCEC\_p\_PD\_InitSlPres + VeCCEC\_p\_PD\_InitSlPresOfst +$$
$$VeCCEC\_p\_PD\_OffgPresAdpOfstOL +$$
$$VeCCEC\_p\_InitOL\_OffgRmp +$$
$$VeCCEC\_p\_PD\_OL\_OffgSlDlyRmp +$$
$$VeCCEC\_p\_OffgColdOfst + VeCCEC\_p\_PD\_BaropresOfst$$

In equation 1, VeCCEC_p_PD_InitSlPres is an estimated pressure required to initiate off-going clutch slip (estimated slip pressure) under the current operating conditions. The estimated slip pressure may be based on the turbine speed at time T(i) (initial turbine speed) and the current transmission input torque. The estimated slip pressure may be a predetermined pressure retrieved from a memory table based on the initial turbine speed and the current transmission input torque. The pressures stored in memory may be predetermined using a combination of laboratory and/or field-based empirical testing and model-based theory.

In an alternate implementation, the estimated slip pressure may be obtained from a mathematical model that relates a clutch torque required to initiate off-going clutch slip, transmission input torque, and turbine speed and/or acceleration for the vehicle system 10. The mathematical model may use a predetermined pressure offset retrieved from a memory table based on the initial turbine speed and the current transmission input torque as an offset to the estimated slip pressure. The mathematical model may be similar to other mathematical models discussed in more detail below. In various implementations, the estimated slip pressure may be obtained from one of a table look-up and a mathematical model based on the current operating conditions and predetermined selection criteria.

VeCCEC_p_PD_InitSlPresOfst is a first control mechanism for offsetting the effects of hydraulic system delays and/or changing transmission input torque. In an exemplary implementation, VeCCEC_p_PD_InitSlPresOfst is a predetermined first pressure offset based on initial turbine speed. VeCCEC_p_PD_InitSlPresOfst may further be based on ambient air pressure. VeCCEC_p_PD_InitSlPresOfst may be obtained from memory based on the initial turbine speed and the current estimated ambient air pressure. Generally, the first pressure offset stored in memory will be the lowest pressure value at which an increase in the first pressure offset results in an increase in off-going clutch slip time.

VeCCEC_p_PD_OffgPresAdpOfstOL is a second control mechanism for adjusting the commanded OGC control pressure based on observed shift performance during the inertia phase previous down shifts. In an exemplary implementation, VeCCEC_p_PD_OffgPresAdpOfstOL is a second pressure offset that is based on the estimated slip pressures and actual slip pressures observed during previous down shifts. The second pressure offset may be used to adjust the commanded OGC control pressure to achieve the desired shift performance (e.g., off-going clutch slip time). The second pressure offset may represent a portion of a single, learned pressure offset calculated based on the estimated and actual slip pressures of previous down shifts from various initial gear ratios to various final gear ratios. The second pressure offset may be determined according to the following equation:

$$\text{VeCCEC\_}p\_\text{PD\_OffgPresAdpOfstOL} = \text{VeCCEC\_}p\_\text{PD\_OffgPresAdpOfst} * \text{KaCCEC\_}k\_\text{PD\_AdaptOffsetOL\_Gx}. \quad (2)$$

In equation 2, VeCCEC_p_PD_OffgPresAdpOfst is the learned pressure offset determined based on the estimated and actual slip pressures of prior down shifts. KaCCEC_k_PD_AdaptOffsetOL_Gx is a scalar representing the portion of the learned pressure offset to be applied towards the commanded OGC slip pressure of the current down shift. Each of the commanded down shifts (e.g., 6-5, 5-4) may have a scalar having a different value representing the portion of the learned pressure offset to be applied for the commanded down shift. Initially, the scalar may be set to a value of 1.0. The scalar for each commanded down shift may be adjusted between zero and 1.0 based on the estimated and actual slip pressures of prior down shifts and the learned pressure offset. The scalar may be further adjusted based on a confidence in the learned pressure offset.

Figure 5:
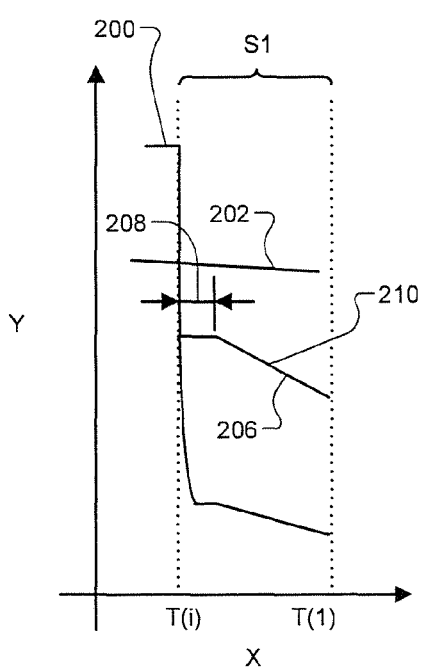

VeCCEC_p_InitOL_OffgRmp is a third control mechanism for initiating off-going clutch slip when off-going clutch slip has not been detected within an expected response period of entering OCG stage S1. In an exemplary implementation, VeCCEC_p_InitOL_OffgRmp is a negative, third pressure offset that decreases the commanded OGC control pressure. VeCCEC_p_InitOL_OffgRmp is reset to zero at the start of the shift, time T(i), and remains zero for a predetermined first delay period after entering OCG stage S1. At the end of the predetermined first delay period, VeCCECp_InitOL_OffgRmp decreases at a predetermined first pressure rate until off-going clutch slip has been detected. VeCCEC_p_InitOL_OffgRmp is a control mechanism for decreasing the commanded OGC control pressure at the predetermined first pressure rate when the commanded OGC control pressure remains above the actual slip pressure for prolonged periods. With particular reference to FIG. 5, an exemplary trace of VeCCEC_p_InitOL_OffgRmp is illustrated and designated by reference numeral 206. The predetermined first delay period is illustrated at reference numeral 208 and the predetermined rate is illustrated at reference numeral 210.

Figure 6:
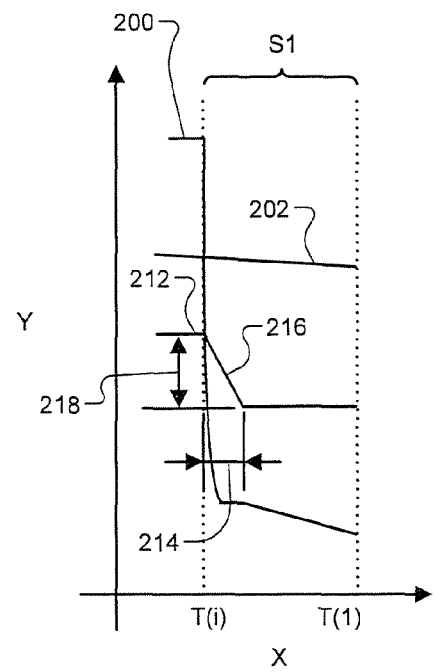
Figure 7:
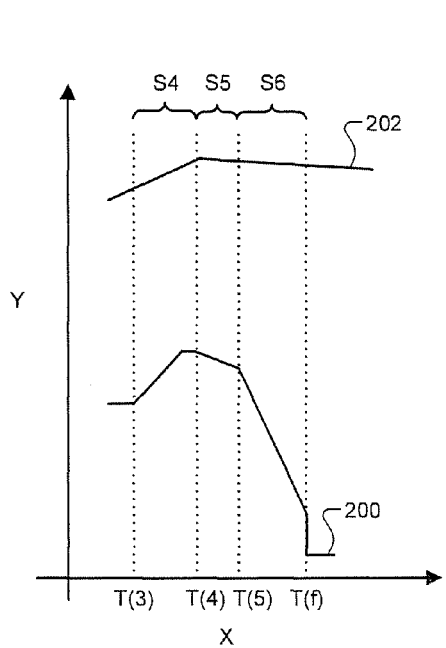

VeCCEC_p_PD_OL_OffgSlDlyRmp is a fourth control mechanism for delaying off-going clutch slip time based on the initial turbine speed. In an exemplary implementation, VeCCECp_PD_OL_OffgSlDlyRmp is a positive, predetermined fourth pressure offset that increases the commanded OGC control pressure for a predetermined delay period. The predetermined delay period is based on the initial turbine speed and the transmission input torque at or just prior to time T(i). VeCCEC_p_PD_OL_OffgSlDlyRmp is set to a predetermined pressure offset greater than zero at the beginning of the shift, time T(i), and decreased at a predetermined second pressure rate until equal to zero. The predetermined pressure is based on the predetermined delay period and the predetermined second pressure rate. A product of the predetermined pressure and the predetermined second pressure rate is equal to the predetermined delay period. With particular reference to FIG. 6, an exemplary trace of VeCCEC_p_PD_OL_OffgSlDlyRmp is illustrated and designated by reference numeral 212. The predetermined delay period is illustrated by reference numeral 214, the second pressure rate is illustrated by reference numeral 216, and the predetermined pressure offset is illustrated by reference numeral 218.

VeCCEC_p_OffgColdOfst is a fifth control mechanism for adjusting the commanded OGC control pressure based on an estimated temperature of the fluid within the apply chamber of the off-going clutch (transmission temperature). In an exemplary implementation, VeCCECp_OffgColdOfst is a predetermined fifth pressure offset based on the current estimated transmission temperature and a first calculated OGC clutch torque used in the subsequent OGC stage S3. Values for VeCCEC_p_OffgColdOfst may be predetermined and stored in a memory table for retrieval based on transmission temperature and clutch torque.

VeCCEC_p_PD_BaropresOfst is a sixth control mechanism for adjusting the commanded OGC control pressure based on ambient air pressure. In an exemplary implementation, VeCCEC_p_PD_BaropresOfst is a predetermined sixth pressure offset based on the current estimated ambient air pressure and initial turbine speed. Values for VeCCECp_PD_BaropresOfst may be predetermined and stored in a memory table for retrieval based on ambient air pressure and turbine speed.

According to the present disclosure, a loop-to-loop pressure difference in the commanded OGC control pressure is limited during OGC stage S1. The loop-to-loop pressure difference is limited to avoid abrupt changes in pressure that can lead to unwanted pressure "ringing" due the dynamics of the hydraulic control system 58. In an exemplary implementation, when the loop-to-loop difference is greater than a predetermined pressure difference, a predetermined percentage of VeCCECp_PriOffgCmd[S1] is commanded. Generally, the predetermined pressure difference will be system dependent and can be determined through empirical testing and/or system modeling. The predetermined percentage may be based on the predetermined pressure difference. The predetermined pressure difference may be a function of the commanded down shift. The predetermined pressure difference and percentage may be stored in memory tables for retrieval based on the commanded down shift.

When used together in the foregoing manner, the predetermined pressure difference and the predetermined percentage can provide an exponential decay feature to the commanded OGC control pressure. In one exemplary system, a predetermined pressure difference of around fifty (50) kiloPascals (kPa) per twenty-five (25) msec was found to be suitable. A corresponding predetermined percentage of around sixty percent (0.6) was found to be suitable. To disable the limiting, the predetermined difference can be set to an unobtainable value.

The commanded OGC control pressure may be further limited, or clipped, to pressures above a predetermined pressure. When the calculated commanded OGC control pressure is greater than the predetermined pressure, the predetermined pressure may be commanded.

Control in OGC stage S1 ends at time T(1) when one or more of the OGC stage S1 exit criteria are met. In an exemplary implementation, control exits OGC stage S1 when off-going clutch slip has been detected, an OGC stage S1 timer has timed out, and/or a down shift timer has timed out. Generally, the control parameters of the various control mechanisms used during OGC stage S1 will ensure the primary criteria for exiting OGC stage S1 is the detection of off-going clutch slip. The OGC stage S1 timer may track a duration of the OGC stage S1 and in various implementations may begin decrementing a predetermined first counter value beginning at time T(i). The predetermined first counter value may represent a desired period for initiating off-going clutch slip. The down shift timer may begin decrementing a predetermined second counter value beginning at time T(i). The predetermined second counter value may be greater than the predetermined first counter value and may represent a desired period for completing the current commanded down shift.

Beginning at the end of OGC stage S1, OGC control continues in OGC stages S2 and S3 during which the commanded OGC control pressure ramps to an inertia phase control pressure. The inertia based control pressure includes a first model-based pressure. Beginning in OGC stage S2, the commanded OGC control pressure is increased to the inertia phase control pressure over a predetermined ramp period. The duration of the predetermined ramp period can be a function of the commanded down shift and can be predetermined based on performance characteristics of the clutches 56 and the hydraulic control system 58. Depending on the duration of the predetermined ramp period, the commanded OGC control pressure may reach the inertia phase control pressure in OGC stage S2 or OGC stage S3. OGC stage S2 begins at time T(1) and ends at time T(2) after one control loop.

During OGC stage S2, the commanded OGC control pressure begins ramping to the inertia phase control pressure and OGC control continues in OGC stage S3. In OGC stage S3, the OGC slip control stage, the commanded OGC control pressure is adjusted to maintain a desired turbine acceleration until a desired clutch slip is achieved and OGC control subsequently enters OGC stage S4. OGC stage S3 begins at time T(2) and ends at time T(3) when OGC stage S3 exit criteria are met.

During OGC stages S2 and S3, the commanded OGC control pressure includes a first model-based pressure command, a scheduled OGC pressure offset command, a closed-loop correction pressure offset, and the temperature compensation pressure offset. The commanded OGC control pressure (VeCCEC_p_PriOffgCmd[S2S3]) during OGC stages S2 and S3 may be determined according to the following equation:

$$VeCCEC\_p\_PriOffgCmd[S2S3] = \quad (3)$$
$$VeOFCC\_p\_PD\_SchedOffgTblCmd+$$
$$VeCCEC\_p\_ScheduledOffgOfstCmd+$$
$$VeOFCC\_p\_CL\_Correction+VeCCEC\_p\_OffgColdOfst$$

In equation 3, VeOFCC_p_PD_SchedOffgTblCmd is the first model-based pressure command, VeCCEC_p_ScheduledOffgOfstCmd is the scheduled OGC pressure offset command, VeOFCC_p_CL_Correction is the closed-loop correction pressure offset, and VeCCECp_OffgColdOfst is the temperature compensation correction offset.

The first model-based pressure command, VeOFCC_p_PD_SchedOffgTblCmd, is a model-based estimate of the off-going clutch pressure required to maintain a desired turbine acceleration. VeOFCC_p_PD_SchedOffgTblCmd may be determined according to the following equation:

$$VeOFCC\_p\_PD\_SchedOffgTblCmd=m1* \\ FinalSchedOffgTorq+SchedOffgCmdOfstyx[S3], \quad (4)$$

where m1 is a predetermined first pressure gain and SchedOffgCmdOfstyx[S3] is a predetermined first pressure offset. The predetermined first pressure gain may be a function of the commanded down shift The predetermined first pressure offset may be a function of initial turbine speed and first calculated OGC clutch torque.

FinalSchedOffgTorq is the first calculated OGC clutch torque and is determined according to the first mathematical model. The first mathematical model relates clutch torque, transmission input torque, and turbine acceleration for the vehicle system 10. More specifically, the first mathematical model relates clutch torque, transmission input torque, and turbine acceleration for the TC 22, the gear train 54, the clutches 56, and the hydraulic control system 58. The inputs to the first mathematical model are the current transmission input torque and the current desired turbine acceleration and the output is the first calculated OGC clutch torque.

The current desired turbine acceleration is obtained from a first turbine acceleration profile associated with the OGC stage S3. Generally, the first turbine acceleration profile will be a desired curve for increasing turbine speed from the initial turbine speed of the initial gear ratio to a turbine speed at or near the estimated final turbine speed in the final gear ratio.

Generally, the first calculated OGC clutch torque is an estimated clutch torque at which the desired turbine acceleration during the OGC stage S3 can be achieved.

The scheduled OGC pressure offset command, VeCCEC_p_SchedOffgOfstCmd, includes a pressure offset used to selectively increase the commanded OGC control pressure based on the possibility of throttle stab. The pressure offset is used to prepare the off-going clutch to counteract effects of throttle stab, such as turbine speed flare. The scheduled OGC pressure offset command may be determined according to the following equation:

$$VeCCEC\_p\_SchedOffgOfstCmd= \quad (5)$$
$$\Sigma(VeOFCC\_p\_PD\_B4Sft\_TCC\_OffstUsed+VeCCEC\_p$$
$$\_StaticSchedOffgOfst+VeCCEC\_p\_PD\_OffgPresAdpOfst+$$
$$VeCCEC\_p\_PD\_BaroPresOFst).$$

In equation 5, VeOFCC_p_PD_B4Sft_TCC_OffstUsed is a first pressure offset based on the initial TC lock-up clutch state. VeCCEC_p_StaticSchedOffgOfst is zero when throttle stab is not detected. When throttle stab is detected, VeCCEC_p_StaticSchedOffgOfst is a second pressure offset based on the initial turbine speed and the first calculated OGC clutch torque. The first and second pressure offsets may be predetermined values retrieved from memory tables. VeCCEC_p_PD_OffgPresAdpOfst is the learned pressure offset discussed above. VeCCECp_PD_BaroPresOFst is the predetermined sixth pressure offset discussed above.

Control in OGC stage S3 ends at time T(3) when one or more of the OGC stage S3 criteria are met. Control may exit OGC stage S3 when a near synchronization condition is detected and/or the following equation is satisfied:

$$VeOFCC\_t\_PD\_EstTmToSync< \\ VeOFCC\_t\_NearSynchRmpTm+ \\ VeOFCC\_t\_PD\_NearSynchPresLeadTm. \quad (6)$$

In equation 6, VeOFCCt_NearSynchRmpTm is a predetermined first control period used to control the duration of OGC stage S3 for shift feel. VeOFCC_t_PD_NearSynchPresLeadTm is a predetermined second control period used to provide a desired period for completing subsequent OGC control stages. OGC stage S3 may also end when the down shift timer has timed out.

Generally, OGC stage S3 will end when equation 6 is satisfied. The near synchronization condition provides a mechanism for reducing the possibility of turbine speed flare as the turbine speed approaches the estimated final turbine speed. In an exemplary implementation, the near synchronization condition is detected when the current turbine speed has increased to within a predetermined near synchronization speed difference of an estimated final turbine speed in the final gear ratio. The predetermined near synchronization speed difference may be a function of the commanded down shift. The predetermined speed difference may be predetermined and stored in memory for retrieval based on the commanded down shift.

OGC control continues in OGC stage S4, the OGC near synchronization boost stage. Generally, in OGC stage S4, the commanded OGC control pressure is increased to facilitate turbine speed pull-over at the end of the inertia phase. If turbine speed "stall out" is detected during OGC stage S4, the commanded OGC control pressure is reduced during a near synchronization ramp out stage (OGC stage S4b) following an interim OGC stage (OGC stage S4a) as illustrated in FIG. 8. OGC stage S4 begins at time T(3) and ends at time T(4) when OGC stage S4 exit criteria are met. According to the present disclosure, turbine speed pull-over can be achieved without actively adjusting engine torque output to facilitate turbine speed pull-over.

In OGC stage S4, the commanded OGC control pressure includes a second model-based pressure command, the scheduled OGC pressure offset command, the final closed-loop correction pressure offset at the end of OGC stage S3, and the temperature compensation pressure offset. The commanded OGC control pressure (VeCCEC_p_PriOffgCmd[S4]) during OGC stage S4 may be determined according to the following equation:

$$VeCCEC\_p\_PriOffgCmd[S4] = \qquad (7)$$
$$VeOFCC\_p\_PD\_TotalNearSyncBoost +$$
$$VeCCEC\_p\_ScheduledOffgOfstCmd +$$
$$VeOFCC\_p\_CL\_Correction_{FINAL} + VeCCEC\_p\_OffgColdOfst$$

In equation 7, VeOFCC_p_PD_TotalNearSyncBoost is the second model-based pressure command, VeCCEC_p_ScheduledOffgOfstCmd is the scheduled OGC pressure offset command, VeOFCCp_CL_Correction$_{FINAL}$ is the final closed-loop correction pressure offset, and +VeCCEC_p_OffgColdOfst is the temperature correction offset.

The second model-based pressure command, VeOFCC_p_PD_TotalNearSyncBoost, may be determined according to the following equation:

$$VeOFCC\_p\_PD\_TotalNearSyncBoost =$$
$$m2*VeOFCC\_M\_PD\_TotNearSyncBoost +$$
$$SchedOffgCmdOfstyx[S4], \qquad (8)$$

where m2 is a predetermined second pressure gain and SchedOffgCmdOfstyx[S4] is a predetermined second pressure offset. The predetermined second pressure gain may be a function of the commanded down shift. The predetermined first pressure offset may be a function of initial turbine speed and a second scheduled OGC clutch torque.

VeOFCC_M_PD_TotNearSyncBoost is the second scheduled OGC clutch torque determined according to the second mathematical model. The second mathematical model relates clutch torque, transmission input torque, and turbine acceleration for the vehicle system 10, and more particularly for the TC 22, the gear train 54, the clutches 56, and the hydraulic control system 58. The inputs to the second mathematical model are the current transmission input torque and the current desired turbine acceleration and the output is the second scheduled OGC clutch torque. In various implementations, a reduction in engine torque may be desired for shift control. Accordingly, the second mathematical model may include as an input, a desired engine torque reduction. It should be understood, however, that the present disclosure does not require engine torque reductions.

The current desired turbine acceleration is obtained from a second turbine acceleration profile associated with OGC stage S4. Ideally, the final turbine acceleration at the point of synchronization according to the second turbine acceleration profile will be zero or approximately zero to ensure a smooth transition into the final gear ratio.

Generally, the second scheduled OGC clutch torque is an estimated clutch torque required to pull over and synchronize the current turbine speed and acceleration to the estimated final turbine speed and turbine acceleration. The second mathematical model and the second turbine acceleration profile can be developed using a combination of laboratory and/or field-based empirical testing and model-based theory. The relationship embodied in the model may be implemented by an equation and/or may be stored as a lookup table.

Control in OGC stage S4 ends at time T(4) when the OGC stage S4 exit criteria are met. Typically, control will exit OGC stage S4 and enter one of OGC stage S5 and OGC stage S6 when the first near synchronization condition is detected. Control will exit to OGC stage S5 when a near synchronization hold timer is greater than zero. Alternately, control will exit to OGC stage S6 when the near synchronization hold timer is less than or equal to zero. The near synchronization hold timer tracks an elapsed time since control entered the OGC stage S4 at time T(3).

If turbine speed "stall out" is detected prior to detecting the first near synchronization condition during OGC stage S4, control exits to the OGC stage S4b (FIG. 8), the near synchronization ramp out stage. Turbine speed stall out may be detected based on one or more turbine speed stall criteria.

In an exemplary implementation, the turbine speed stall criteria include the near synchronization hold timer and a change in turbine speed indicative of forward progress of the down shift. The change in turbine speed may be a difference between the current turbine speed and a delayed measurement of turbine speed (turbine speed difference). The turbine speed stall criteria further include a difference between the current turbine acceleration and an expected turbine acceleration profile (turbine acceleration difference), and a closed-loop error difference. The closed-loop error difference is a rate at which the turbine speed is diverging from the desired turbine speed.

Turbine speed stall out is detected based on a comparison of the turbine speed stall criteria and associated turbine stall control parameters. Turbine speed stall out is detected when the near synchronization hold timer is greater than or equal to a predetermined elapsed time and/or the turbine speed difference is greater than or equal to a predetermined speed difference. Turbine speed stall out is further detected when the turbine acceleration difference is greater than or equal to a predetermined acceleration and/or the closed-loop error difference is greater than or equal to a predetermined error difference. The turbine stall control parameters (e.g., predetermined speed difference) may be based on the commanded down shift and may be stored in memory tables for retrieval based on the commanded down shift. Control exits to OGC stage S4b when one or more of the turbine speed stall criteria are met.

With particular reference to FIG. 8, if turbine speed stall out is detected prior to reaching the first near synchronization condition and prior to reaching a targeted near synchronization boost pressure, a target turbine acceleration synchronization pressure at synchronization is set equal to the commanded OGC control pressure at the time turbine speed stall out was detected. During the first control loop in OGC stage S4b, the commanded OGC control pressure, VeCCEC_p_PriOffgCmd[S4], is decreased by a predetermined stall out pressure offset.

In an exemplary implementation, the predetermined stall out pressure offset is a function of the commanded down shift and is stored in a memory table for retrieval based on the commanded down shift. Subsequently, the commanded OGC control pressure is adjusted at a predetermined stall out pressure rate until OGC stage S4b exit criteria are met. The predetermined stall out pressure rate is a function of the current commanded gear slip, which represents a desired difference between the current turbine speed and the estimated final turbine speed. Generally, the predetermined stall out pressure rate will be negative for negative commanded gear slip rates and the commanded OGC control pressure will decrease at the predetermined stall out pressure rate as illustrated in FIG. 8.

The commanded OGC control pressure is adjusted until the OGC stage S4b exit criteria are met. If the commanded gear slip is greater than a predetermined gear slip when the OGC stage S4b exit criteria are met, the commanded OGC control pressure is increased up to the target turbine acceleration synchronization pressure over one control period prior to exiting to OGC stage S5.

OGC control in OGC stage S4b ends when one or more of the OGC stage S4b exit criteria are met. In an exemplary implementation, control exits OGC stage S4b when an estimated time to synchronization is less than or equal to a predetermined first lead period and/or a near synchronization ramp out timer is greater than or equal to a predetermined ramp out period. The estimated time to synchronization is a periodic calculation beginning at time T(i) that estimates the remaining time until synchronization. The estimated time to synchronization is a function of a desired shift time, a percent shift complete (e.g., ratio progression), and the current turbine acceleration. The predetermined first lead period and the predetermined ramp out period may be a function of the commanded down shift. The predetermined first lead period and the predetermined ramp out period may be predetermined and stored in memory tables for retrieval based on the commanded down shift.

In FIG. 8, a time T(s) designates a time when turbine stall is detected, the target turbine acceleration synchronization pressure is designated at reference numeral 220. The predetermined stall out pressure offset is designated at reference numeral 222. The predetermined stall out pressure rate is designated at reference numeral 224.

OGC control continues in OGC stage S5, the near synchronization hold stage, at time T(4). Generally, OGC control may enter OGC stage S5 when the first synchronization condition is detected during OGC stage S4, including OGC stage S4b. OGC control exits OGC stage S5 when one or more OGC stage S5 exit criteria are met. During OGC stage S5, the commanded OGC control pressure is adjusted to provide a desired clutch torque for a predetermined hold period to attenuate any late turbine speed flares that may occur between preceding OGC stage S4 and subsequent OGC stage S6.

In an exemplary implementation, the commanded OGC control pressure is decreased at a predetermined hold pressure rate for the predetermined hold period. The predetermined hold period and the predetermined hold pressure rate are a function of the commanded down shift and the initial turbine speed. The predetermined hold period and hold pressure rate may be predetermined and stored in memory tables for retrieval based in the commanded down shift and turbine speed. The predetermined hold period may be set to zero. In this case, OGC control exits OGC stage S4 directly to OGC stage S6.

In FIG. 8, the predetermined hold period is designated by reference numeral 226, and the predetermined hold pressure rate is designated by reference numeral 228.

OGC control in OGC stage S5 ends when one or more of the OGC stage S4b exit criteria are met. In an exemplary implementation, control exits OGC stage S5 when the estimated time to synchronization is less than or equal to a predetermined second first lead period and/or near synchronization hold timer is greater than the predetermined hold period. The predetermined first lead period and the predetermined hold period are a function of the commanded down shift and may be predetermined values stored in memory tables for retrieval based on the commanded down shift.

OGC control continues in OGC stage S6, the OGC torque phase ramp out stage, at time T(5) and ends when OGC stage S6 exit criteria are met. During OGC stage S6, the commanded OGC control pressure is decreased to a predetermined destroke pressure over a destroke period. In an exemplary implementation, the destroke period is predetermined and the commanded OGC control pressure is linearly decreased to the predetermined destroke pressure. The predetermined destroke period and the predetermined destroke pressure are a function of the commanded down shift. The predetermined destroke pressure may be greater than or equal to zero. The predetermined destroke period and the predetermined destroke pressure may be predetermined and stored in memory tables for retrieval based on the commanded down shift.

In FIG. 8, the predetermined destroke period is designated by reference numeral 230 and the predetermined destroke pressure is designated by reference numeral 232.

In various implementations, the commanded OGC control pressure can be frozen for a period when turbine speed flare is detected. Turbine speed flare may be detected based on one or more turbine speed flare criteria. In an exemplary implementation, the turbine speed flare criteria include a comparison of the current turbine speed and the estimated final turbine speed. Turbine speed flare is detected when a difference between the current turbine speed and the estimated final turbine speed is greater than a predetermined flare speed difference. The predetermined flare speed difference may be a function of the commanded down shift and may be stored in memory for retrieval based on the commanded down shift.

Figure 9:
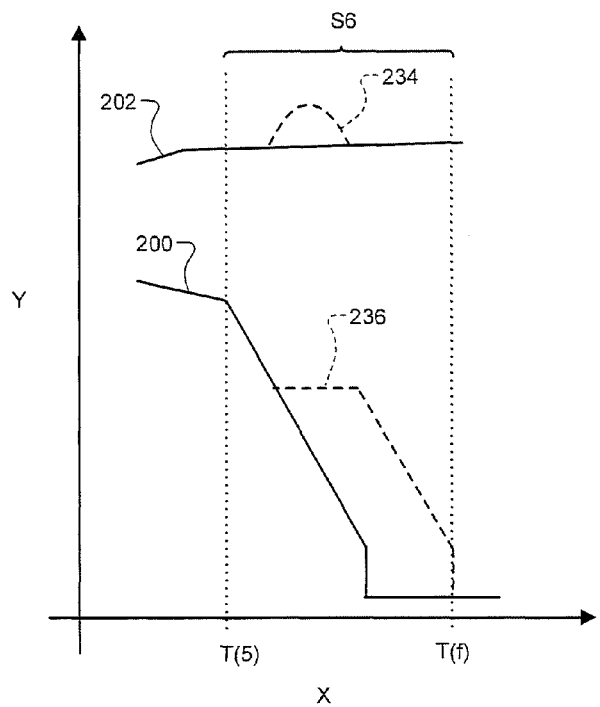

Once the turbine speed flare has passed, the commanded OGC control pressure is linearly reduced to the predetermined destroke pressure. In FIG. 9, the turbine speed flare is illustrated by the dashed line designated by reference numeral 234. The commanded OGC control pressure during and subsequent to the turbine speed flare is illustrated by the dashed line designated as reference numeral 236.

With additional reference to FIGS. 10-11, OCC control according to the present disclosure will be described in further detail. OCC control begins in OCC stage S1', the OCC chamber fill stage. During OCC stage S1', the commanded OCC control pressure is increased to fill an apply chamber (not shown) of the on-coming clutch to a predetermined fill volume within a predetermined fill period. Generally, the commanded OCC control pressure will be sufficiently low to ensure a known and predictable relationship between the commanded OCC control pressure and the actual fill rate. An exemplary hydraulic flow model for use in estimating the volume of fluid supplied to an apply chamber is described in commonly assigned U.S. Pat. No. 6,285,942. OCC stage S1' begins at time T(i) and ends at time T(6) when the apply chamber has been filled to the predetermined fill volume.

OCC control continues in OCC stage S2', the OCC clutch staging stage, during which the commanded OCC pressure is adjusted to maintain the on-coming clutch apply chamber at a desired fill level greater than the predetermined fill volume. Once filled in OCC stage S1', additional fluid flow into the apply chamber during OCC stage S2' begins to advance a piston (not shown) and thereby engage the piston with clutch plates of the on-coming clutch. In various configurations, the apply chamber may advance the piston against a return spring that disengages the piston from the clutch plates at low pressures. Once engaged, continued fluid flow into the apply chamber increases the torque capacity of the on-coming clutch.

Generally, the desired fill level during OCC stage S2' is a fill level at which the torque capacity of the on-coming clutch is low enough to avoid any significant "tie-up" feel, yet high enough to enable the torque capacity of the on-coming clutch to be increased rapidly in the subsequent OCC stage S3' and OCC stage S4'. OCC stage S2' begins at time T(6) and ends at time T(7) when one or more OCC stage S2' exit criteria are met.

In an exemplary implementation, control exits OCC stage S2' when the estimated time to synchronization is less than a predetermined first lead time and/or a shift progression measure is greater than a predetermined progression measure. The predetermined first lead time and the predetermined progression measure are a function of the commanded down shift. The predetermined first lead time and progression measure may be predetermined and stored in memory tables for retrieval based on the commanded down shift.

The shift progression measure tracks down shift progression based on the current turbine speed and the estimated final turbine speed. The shift progression measure may be a quotient of a change in turbine speed since the start of the inertia phase and a total change in turbine speed required to complete the inertia phase. The shift progression measure may be obtained by dividing a difference between the current turbine speed and the initial turbine speed by a difference between the estimated final turbine speed and the initial turbine speed.

OCC control continues in OCC stage S3', the OCC slow ramp stage. OCC stage S3' begins at time T(7) and ends at time T(8) when OCC stage S3' exit criteria are met. According to the present disclosure, the first near synchronization condition will typically occur within OCC stage S3', and therefore between time T(7) and T(8). In OCC stage S3', the commanded OCC pressure is increased to increase OCC clutch torque to a first torque capacity level. The OCC clutch torque is increased in order to prepare the on-coming clutch to quickly lock in the subsequent OCC stage S4'.

In an exemplary implementation, the commanded OCC control pressure is first stepped up by a predetermined S3' pressure offset over one control loop and then increased at a predetermined S3' pressure rate. The predetermined S3' pressure offset is a function of the commanded down shift and the current transmission input torque. The predetermined S3' pressure rate is a function of the commanded down shift, the initial turbine speed, and the current transmission input torque. The predetermined S3' pressure offset and S3' pressure rate may be predetermined and stored in memory tables for retrieval based on the commanded down shift, the initial turbine speed, and the current transmission input torque.

Figure 10:
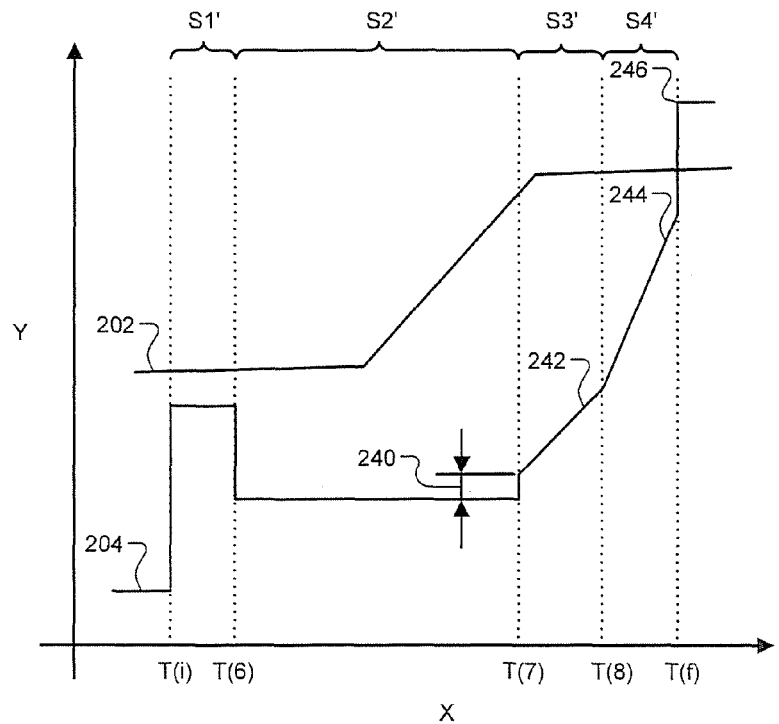

In FIG. 10, the predetermined S3' pressure offset is designated by reference numeral 240. The predetermined S3' pressure rate is designated by reference numeral 242.

OCC stage S3' ends at time T(8) when one or more OCC stage S2' exit criteria are met. In an exemplary implementation, control exits OCC stage S3' when the estimated time to synchronization is less than a predetermined S4' lead time and/or the shift progression measure is greater than a predetermined S3' progression measure. The predetermined S4' lead time and the predetermined S3' progression measure are a function of the commanded down shift. The predetermined S4' lead time and stage S3' progression measure may be predetermined and stored in memory tables for retrieval based on the commanded down shift.

In various implementations, it may be desired to exit OCC stage S3' after synchronization has occurred. In this case, the predetermined S4' lead time may be set to a negative value and the predetermined S3' shift progression measure may be set to an unobtainable value. After synchronization, the estimated time to synchronization will go negative and OCC stage S3' will end when the estimated time to synchronization is less than the negative value.

OCC control continues in OCC stage S4', the OCC quick lock-up stage. OCC stage S4' begins at time T(8) and ends at time T(f) when OCC stage S4' exit criteria are met. During OCC stage S4', the commanded OCC control pressure is increased to a level corresponding to a second torque capacity level at which the on-coming clutch is locked. In an exemplary implementation, the commanded OCC control pressure is increased at a predetermined S4' pressure rate greater than the predetermined S3' pressure rate until the exit criteria are met. When the exit criteria are met, the commanded OCC control pressure is increased to a predetermined stroke pressure over one control loop and OCC control ends.

Generally, the predetermined stroke pressure will be a maximum control pressure at which the on-coming clutch is operated in the final gear ratio. The predetermined stroke pressure may be a function of the final gear ratio. The predetermined stroke pressure may be predetermined and stored in a memory table for retrieval based on the final gear ratio.

In FIG. 10, the predetermined S4' pressure rate is designated by reference numeral 244. The predetermined stroke pressure is designated by the reference numeral 246.

In various implementations, the exit criteria may be met when all of the following conditions are satisfied: OGC stage S6 is complete, synchronization has been detected, an elapsed time since turbine speed flare was detected is greater than a predetermined post flare period, an elapsed time since the first near synchronization condition was detected is greater than a predetermined latch period, and other down shift pressure ramp controls are not active. In implementations using engine torque reductions, the exit criteria further includes the condition that engine torque output has been restored. Each of the foregoing predetermined control parameters may be a function of the commanded down shift and may be stored in memory tables for retrieval based on the commanded down shift.

In the exemplary implementation, the rate at which the commanded OCC control pressure is increased in OCC stages S3' and S4', the predetermined S3' and S4' pressure rates, is adjusted when turbine speed flare is detected during OCC stage S3' or S4'. If turbine speed flare is detected in OCC stage S3' the rate at which the commanded OCC control pressure is increased is adjusted (e.g., stepped) by a first predetermined flare pressure offset. If turbine speed flare is detected in OCC stage S4', the commanded OCC control pressure is increased at the predetermined S3' pressure rate plus a second predetermined flare pressure offset. The predetermined first and second flare pressure offsets may be positive or negative, and thus, may increase or decrease the rate at which the commanded OGC control pressure is increased during periods of turbine speed flare over the rates prior to turbine speed flare. The first and second flare pressure offsets may be a function of the commanded down shift and may be stored in memory for retrieval. In various implementations, the first and second flare pressure offsets may be equal or, alternatively, may be different.

Figure 11:
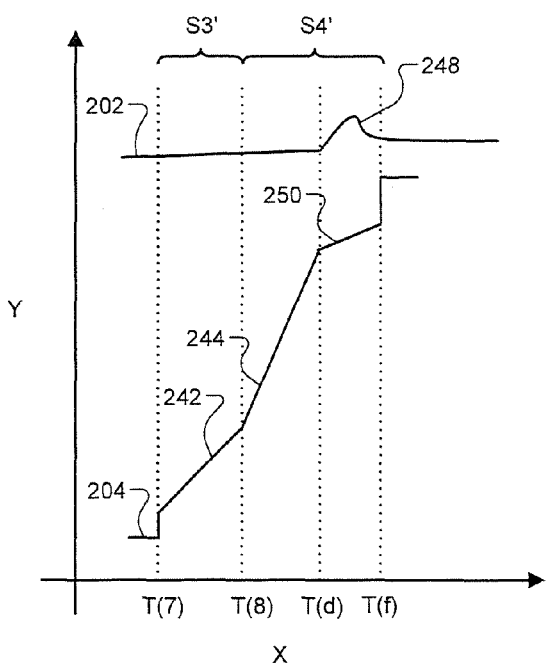

FIG. 11 illustrates turbine speed flare during OCC stage S4'. In FIG. 11, the turbine speed flare is detected at time T(d) and is designated by reference numeral 248. The adjusted predetermined second pressure rate is designated by reference numeral 250.

Figure 12:
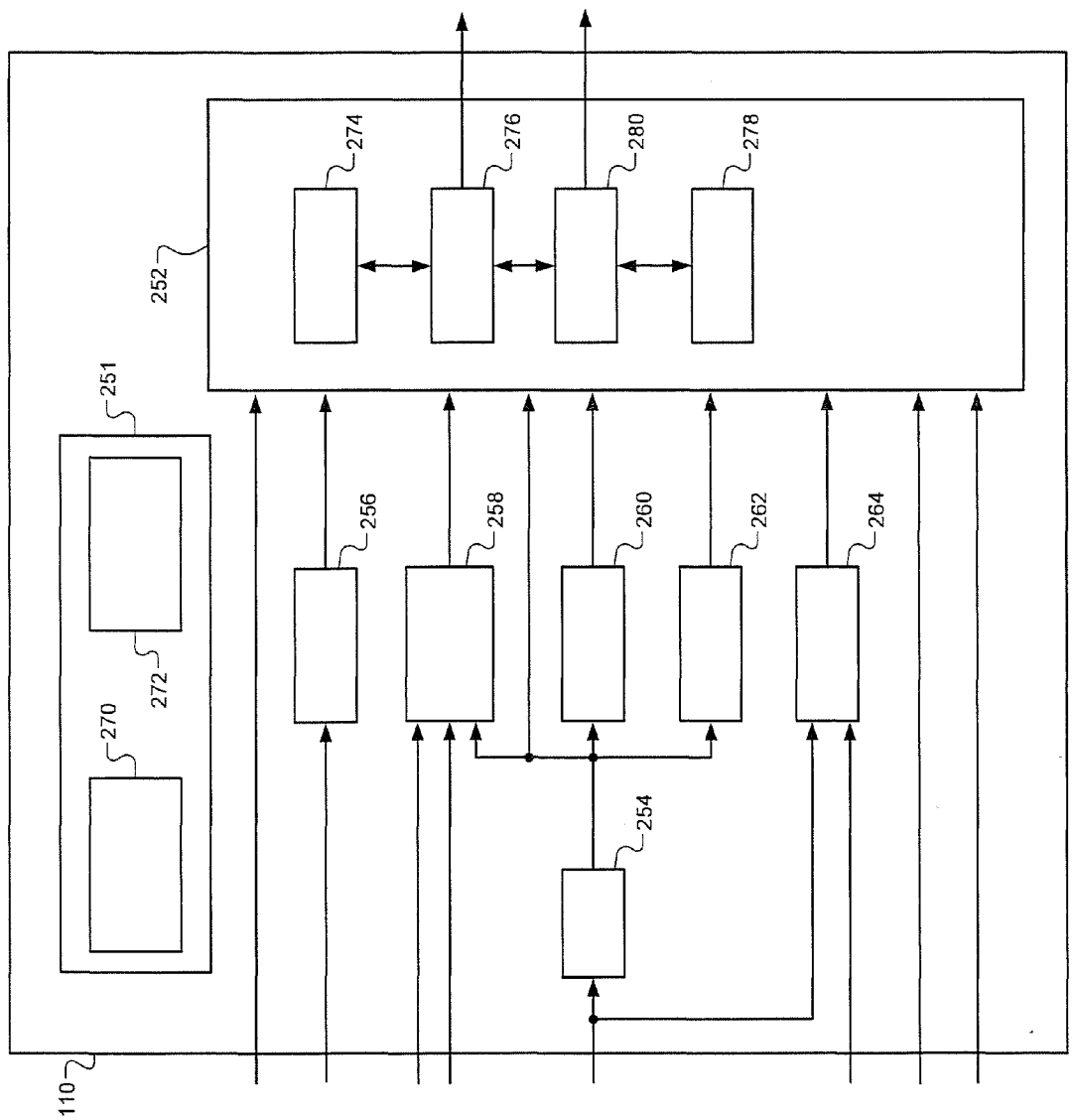
FIG. 12 is a functional block diagram of an exemplary implementation of a shift control module in an exemplary transmission control system according to the present disclosure.

With particular reference to FIG. 12, an exemplary implementation of the shift control module 110 is presented. The shift control module 110 includes various modules for implementing off-going clutch pressure and on-coming clutch pressure control during a power-on down shift according to the principles discussed above. The shift control module 110 includes a memory module 251 a pressure control module 252. The shift control module 110 further includes modules that determine various control parameters used by the pressure control module 252. The additional modules include a speed module 254, a temperature module 256, a torque module 258, a stall module 260, a flare module 262, and a slip module 264.

The memory module 251 may be non-volatile memory including OGC parameter tables 270 and OCC parameter tables 272. The OGC parameter tables 270 include various tables where the control parameters used to control the off-going clutch pressures according to the present disclosure are stored for retrieval by the other modules of the shift control module 110. The OCC parameter tables 272 include various tables where the control parameters used to control the on-coming clutch pressures according to the present disclosure are stored for retrieval.

The pressure control module 252 generates the timed control signals that are output to the hydraulic circuit 108 to control off-going and on-coming clutch control pressures. The timed control signals include a first timed signal that conveys the commanded OGC control pressures for each of the stages of OGC control and a second timed signal that conveys the commanded OCC control pressures for each of the stages of OCC control. The pressure control module 252 communicates the commanded OGC and OCC control pressures based on the various operating conditions and control parameters used to determine the commanded OGC and OCC control pressures. The operating conditions may be communicated to the pressure control module 252 via signals generated by various other modules and sensors of the vehicle system 10. Various control parameters may be retrieved from the memory module 251.

In the present example, the pressure control module 252 receives signals conveying the commanded down shift, the current turbine speed, the current transmission temperature, the current transmission input torque, and the current clutch slip. The pressure control module 252 also receives signals indicating whether turbine stall out has been detected and whether turbine speed flare has been detected. The pressure control module 252 may also receive other driver and vehicle inputs as shown.

The pressure control module 252 includes an OGC stage module 274, an OGC module 276, an OCC stage module 278, and an OCC module 280 that work together to generate the timed commanded OGC and OCC control pressure signals. The OGC stage module 274 determines the current stage of OGC control based on the various inputs received by the pressure control module 252 and control parameters stored in the OGC parameter tables 270. The OGC stage module 274 determines the current stage of OGC control based on the commanded down shift and the various OGC stage entry and exit criteria. The OGC stage module 274 communicates the current stage of OGC control to the OGC module 276.

The OGC module 276 determines the commanded OGC control pressure during each stage of OGC control. Although not shown, it will be appreciated that the OGC module 276 may include various sub-modules for determining various control parameters, such as the estimated time to synchronization and elapsed times, used to determine the commanded OGC control pressure for each stage. The OGC module 276 determines the OGC control pressure based on the various inputs received by the pressure control module 252 and control parameters stored in the OGC parameter tables 270. The OGC module 276 outputs the timed control signal indicative of the commanded OGC control pressure determined to the hydraulic circuit 108.

The OCC stage module 278 determines the current stage of OCC control based on the various inputs received by the pressure control module 252 and control parameters stored in the OCC parameter tables 272. The OCC stage module 278 communicates the current stage of OCC control to the OCC module 280.

The OCC stage module 278 determines the current stage of OCC control based on the commanded down shift and the various OCC stage entry and exit criteria. The OCC module 280 determines the commanded OCC control pressure during each stage of OCC control. Although not shown, it will be appreciated that the OCC module 280 may include various sub-modules for determining various control parameters used to determine the commanded OCC control pressure for each stage. The OCC module 280 determines the OCC control pressure based on the various inputs received by the pressure control module 252 and control parameters stored in the OCC parameter tables 272. The OCC module 280 outputs the timed control signal indicative of the commanded OCC control pressure determined to the hydraulic circuit 108.

The speed module 254 determines the current turbine speed and outputs a signal indicative of the current turbine speed. The speed module 254 may determine the current turbine speed based on the current input shaft speed. The speed module 254 may receive the current input shaft speed via the signal generated by the first speed sensor 112.

The temperature module 256 determines the current transmission temperature and outputs a signal indicative of the current transmission temperature. The temperature module 256 may determine the current transmission temperature based on the current fluid temperature within the transmission 24. The temperature module 256 may receive the current fluid temperature via the signal generated by the temperature sensor 116.

The torque module 258 determines the current transmission input torque and outputs a signal indicative of the current transmission input torque. In various implementations, the torque module 258 may determine a current compensated input torque based on the current estimated engine torque output, the current engine speed, and the current turbine speed. The torque module 258 may receive the current estimated engine output torque from another module of the control module 14 that estimates the current engine output torque according to known methods. The torque module may receive the current turbine speed from the speed module 254 and the current engine speed via the signal generated by the second speed sensor 114 as shown.

The stall module 260 detects whether turbine stall out has occurred and outputs a signal indicating whether turbine stall out has been detected. The stall module 260 may detect turbine stall out based on the current turbine speed and the turbine speed stall criteria. The stall module 260 may receive the current turbine speed from the speed module 254 and may communicate with the various other modules of the shift control module 110 to obtain the turbine speed stall criteria.

The flare module 262 detects whether turbine speed flare has occurred and outputs a signal indicating whether turbine speed flare has been detected. The flare module 262 may detect turbine speed flare based on the current turbine speed and the turbine speed flare criteria. The flare module 262 may obtain the current turbine speed from the speed module 254. The flare module 262 may communicate with the various other modules of the shift control module 110 to obtain the turbine speed flare criteria.

The slip module 264 detects the current clutch slip and outputs a signal indicating the current clutch slip. The slip module 264 may determine the current clutch slip based on the current input shaft speed and the current output shaft speed. The slip module 264 may receive the current input shaft speed from the first speed sensor 112 and the current output shaft speed from the third speed sensor 120.

FIGS. 13-16 illustrate an exemplary method 300 for controlling off-going clutch pressure and on-coming clutch pressure during a power-on down shift according to the present disclosure is presented. The method 300 may be implemented in a transmission control system of a vehicle system, such as the vehicle system 10 discussed above. The method 300 includes blocks 302-336 (FIGS. 13-14) illustrating control of off-going clutch pressure, and blocks 350-372 (FIGS. 15-16) illustrating control of on-coming clutch pressure. Together, blocks 302-336 and blocks 350-372 illustrate concurrent control of the off-going and on-coming clutches according to the present disclosure.

Figure 13:
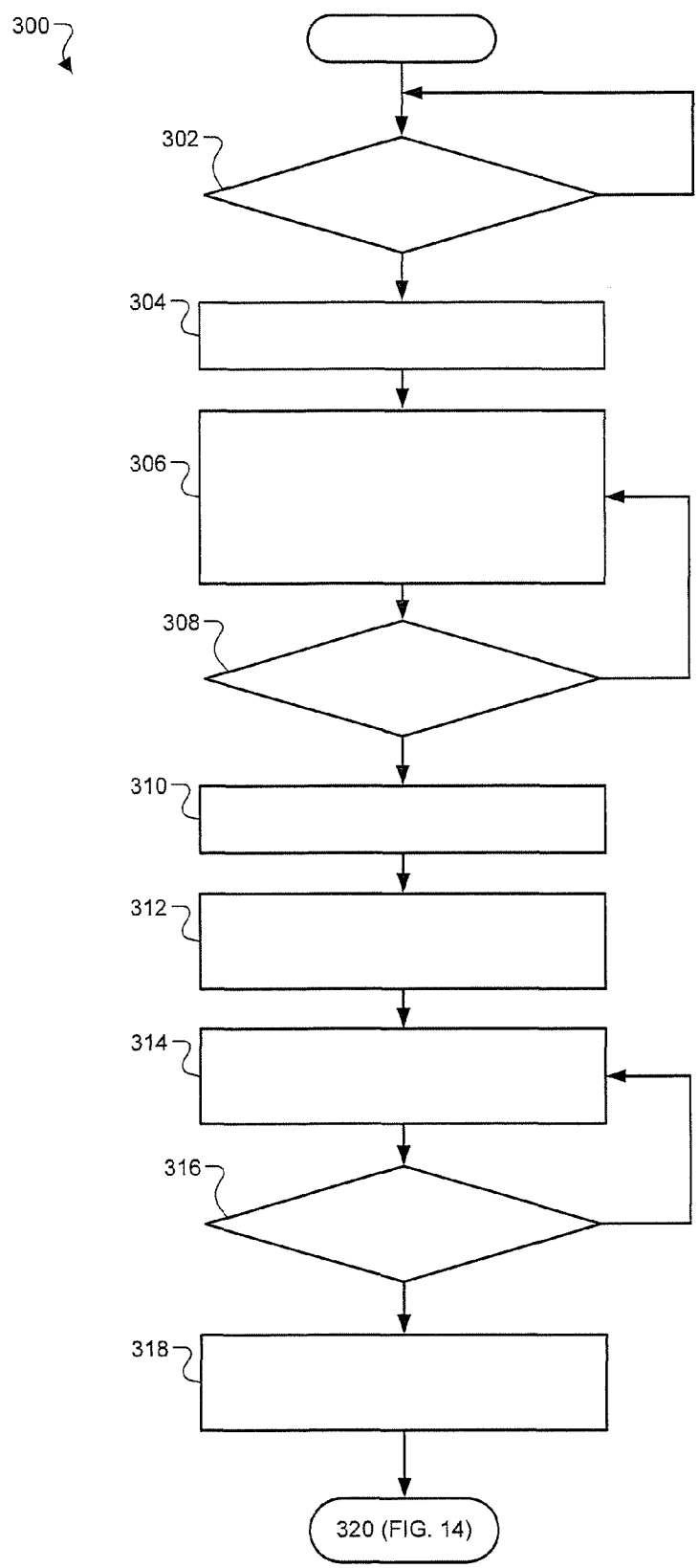
FIGS. 13-16 are flow diagrams illustrating an exemplary method for controlling off-going and on-coming clutch control pressures during a shift operation according to the present disclosure.
Figure 14:
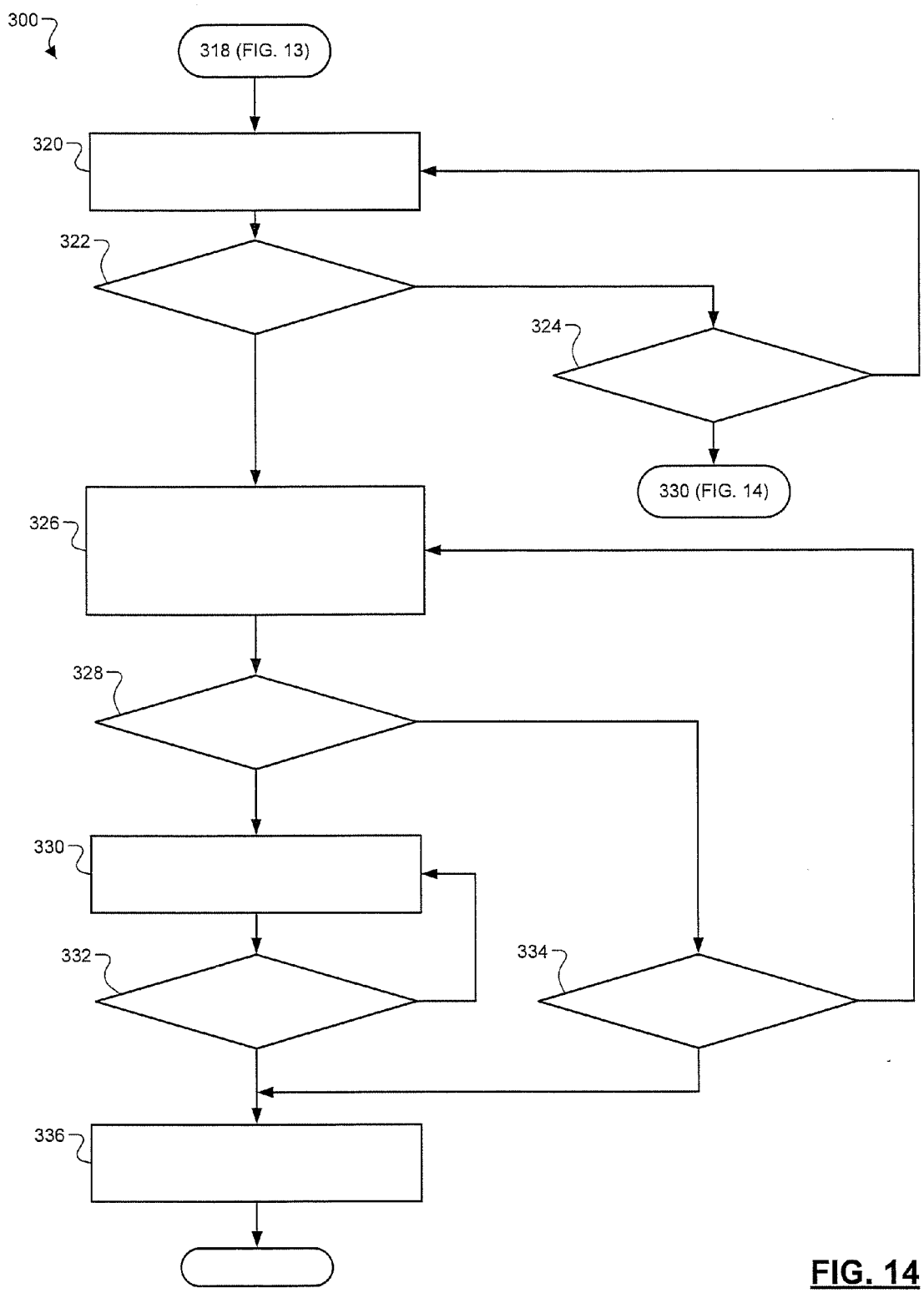

With particular reference to FIGS. 13-14, off-going clutch pressure control according to the method 300 begins at 302 where control determines whether a power-on down shift has been commanded. If yes, control proceeds at 304, otherwise control loops back as shown.

At 304, control enters OGC stage 51 and periodically determines VeCCEC_p_PriOffgCmd[S1]. At 306, control decreases the commanded OGC control pressure based on VeCCECp_PriOffgCmd[S1], the predetermined loop-to-loop pressure difference, and predetermined stage S1 pressure. At 308, control determines whether to exit to OGC stage S2 control based on the OGC stage S1 exit criteria. If yes, then control proceeds at 310, otherwise control continues at 306.

At 310, control enters OGC stage S2 and begins periodically determining VeCCEC_p_PriOffgCmd[S2S3]. At 312, control adjusts the commanded OGC control pressure for one control loop based on VeCCECp_PriOffgCmd[S2S3]. At 314, control enters OGC stage S3 and control continues to adjust the commanded OGC control pressure based on VeCCEC_p_PriOffgCmd[S2S3]. At 316, control determines whether to exit to OGC stage S4 control based on the OGC stage S3 exit criteria. If yes, control proceeds at 318, otherwise control continues at 314.

At 318, control enters OGC stage S4 and control periodically determines VeCCEC_p_PriOffgCmd[S4]. At 320 (FIG. 14), control increases the commanded OGC control pressure based on VeCCECp_PriOffgCmd[S4]. At 322, control determines whether turbine speed stall out has occurred based on the turbine speed stall out criteria. If yes, then control proceeds at 326, otherwise control proceeds at 324. At 324, control determines whether to exit OGC stage S5 based on the OGC stage S4 criteria. If yes, then control proceeds at 330, otherwise control continues at 320.

At 326, control decreases the commanded OGC control Pressure based on VeCCEC_p_PriOffgCmd[S4], the predetermined stall pressure offset, and the predetermined stall pressure rate. At 328, control determines whether to exit to OGC stage S5 based on the OGC stage S4b exit criteria. If yes, then control increases the commanded OGC control pressure to the target turbine acceleration synchronization pressure and control proceeds at 330.

At 330, control enters OGC stage S5 and periodically adjusts the commanded OGC control pressure based on VeCCEC_p_PriOffgCmd[S4]. Control decreases the commanded OGC control pressure at the predetermined hold pressure rate for the predetermined hold period. At 332, control determines whether to exit to OGC stage S6 based on the OGC stage S5 exit criteria. Control may exit to OGC stage S6 at the end of the predetermined hold period. If control determines to exit to OGC stage S6, then control proceeds at 336, otherwise control continues at 330.

At 334, control determines whether to exit to OGC stage S6 based on the OGC stage S4b exit criteria. If yes, then control proceeds at 336, otherwise control continues at 326.

At 336, control decreases the commanded OGC control pressure to the predetermined destroke pressure over the destroke period and OGC control according to the method 300 ends.

Figure 15:
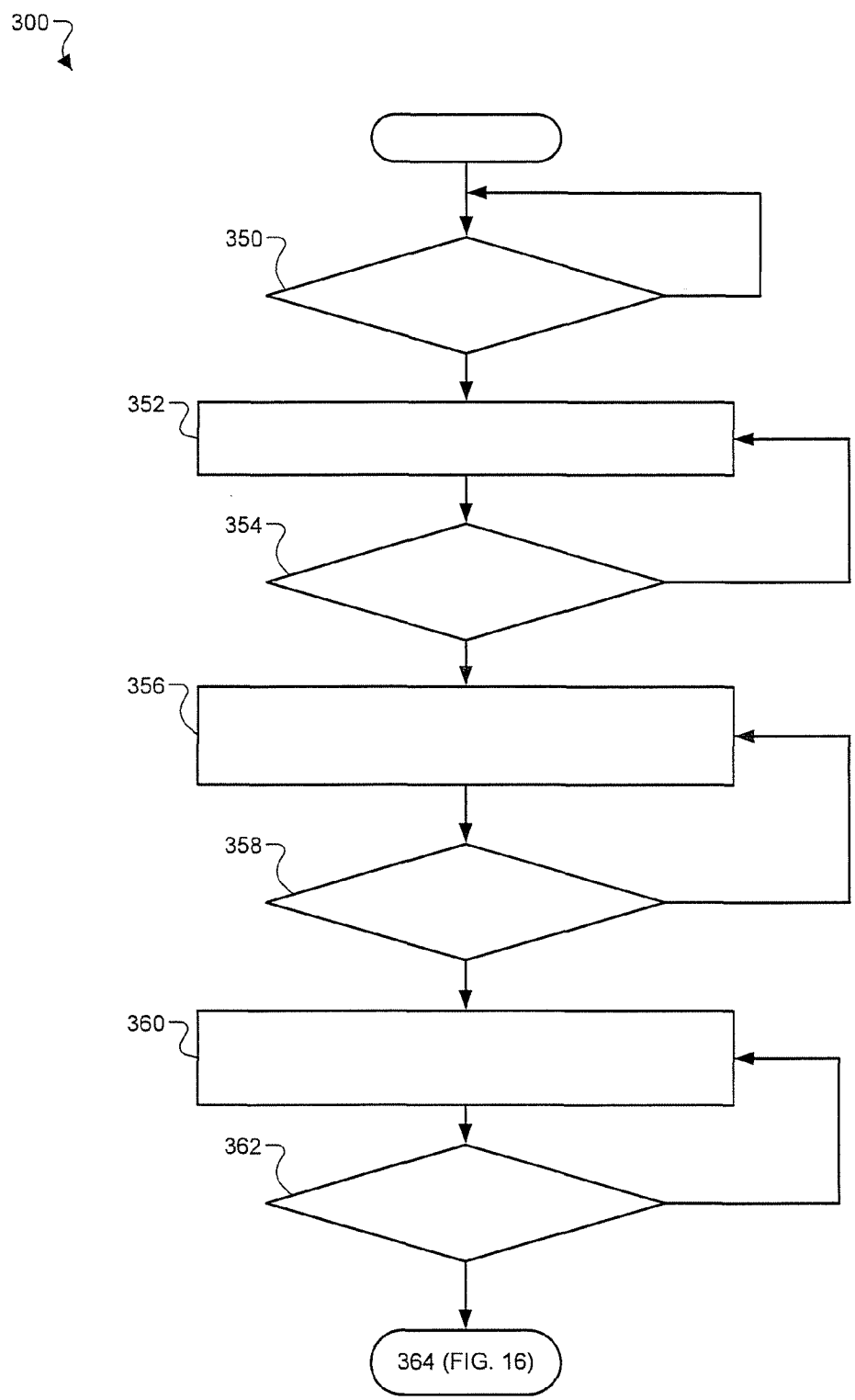
Figure 16:
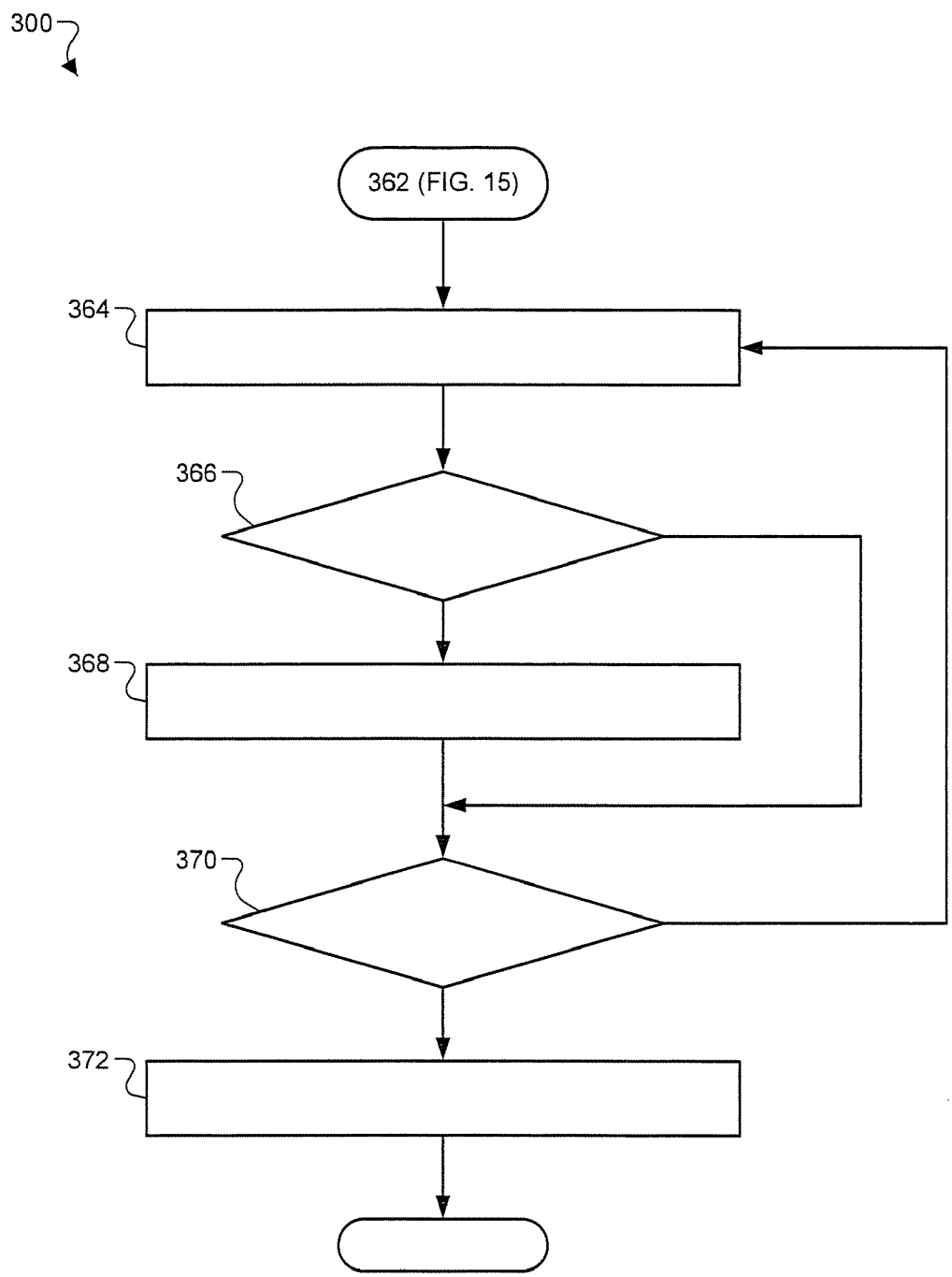

With particular reference to FIGS. 15-16, on-coming clutch pressure control according to the method 300 begins at 350 where control determines whether a power-on down shift has been commanded. If yes, control proceeds at 352, otherwise control loops back as shown.

At 352, control enters OCC stage S1' and control begins filling the on-coming clutch apply chamber by increasing the commanded OCC control pressure. At 354, control determines whether the predetermined fill volume has been achieved. If yes, then control proceeds at 356, otherwise control continues filling at 352.

At 356, control enters OCC stage S2' and control periodically adjusts the commanded OCC control pressure to maintain the on-coming clutch apply chamber at the desired fill level corresponding to the desired torque capacity for staging the on-coming clutch for OCC stages S3' and S4'.

At 358, control determines whether to exit to OCC stage S3' based on the OCC stage S2' exit criteria. If yes, then control proceeds at 360, otherwise control continues at 356.

At 360, control enters OCC stage S3' and control increases the commanded OCC control pressure to the first torque capacity level to prepare the on-coming clutch to quickly lock in the subsequent OCC stage S4'. Control steps up the commanded OCC control pressure by the predetermined S3' pressure offset and then increases the commanded OCC control pressure at the predetermined S3' pressure rate.

At 362, control determines whether to exit to OCC stage S4' based on the OCC stage S3' exit criteria. If yes, then control proceeds at 364 (FIG. 16), otherwise control continues at 360.

At 364, control enters OCC stage S4' and increases the commanded OCC control pressure at the predetermined S4' pressure rate. At 366, control determines whether turbine speed flare has occurred based on the turbine speed flare criteria. If yes, then control proceeds at 368, otherwise control proceeds at 370.

At 368, control increases the commanded OCC control pressure at the adjusted S4' pressure rate. The adjusted S4' pressure rate is based on the predetermined S3' pressure rate and the first predetermined flare pressure offset. At 370, control determines whether the OCC stage S4' exit criteria are met. If yes, then control proceeds at 372, otherwise, control continues at 364.

At 372, control increases the commanded OCC control pressure to the predetermined stroke pressure and OCC control according to the method 300 ends.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system for an automatic transmission coupled to an engine by a torque converter, comprising:
   a torque module that determines an input torque to said transmission based on an output torque of said engine; and
   a first clutch control module that adjusts an acceleration of a turbine of said torque converter during a down shift of said transmission by adjusting a first pressure of fluid supplied to an off-going clutch of said transmission based on said input torque,
   wherein said first clutch control module adjusts said first pressure based on a mathematical model that relates a torque capacity of said off-going clutch, said input torque, and said acceleration, said mathematical model being embodied in one of an equation and a lookup table stored in a memory module.

2. The control system of claim 1, wherein said first clutch control module decelerates said turbine by increasing said first pressure.

3. A control system for an automatic transmission coupled to an engine by a torque converter, comprising:
   a torque module that determines an input torque to said transmission based on an output torque of said engine; and
   a first clutch control module that adjusts an acceleration of a turbine of said torque converter during a down shift of said transmission by adjusting a first pressure of fluid supplied to an off-going clutch of said transmission based on said input torque,
   wherein said input torque is a compensated input torque based on at least one of an engine speed, a turbine speed, and a torque ratio of said torque converter.

4. The control system of claim 3, further comprising:
   a stage module that begins a first control stage in response to a request for said down shift and ends said first control stage when one of off-going clutch slip is detected and an elapsed time of said first control stage is greater than a predetermined first period, and that begins a second control stage at an end of said first control stage,
   wherein said first clutch control module initiates said off-going clutch slip during said first control stage by decreasing said first pressure, and adjusts said first pressure during said second control stage based on said input torque.

5. The control system of claim 4, wherein said first clutch control module limits a rate of change in said first pressure during said first control stage.

6. A control system for an automatic transmission coupled to an engine by a torque converter, comprising:
   a torque module that determines an input torque to said transmission based on an output torque of said engine; and
   a first clutch control module that adjusts an acceleration of a turbine of said torque converter during a down shift of said transmission by adjusting a first pressure of fluid supplied to an off-going clutch of said transmission based on said input torque,
   wherein when turbine speed stall is detected while said first clutch control module is adjusting said acceleration, said first clutch control module initially steps said first pressure down by a predetermined pressure and subsequently decreases said first pressure at a predetermined pressure rate.

7. The control system of claim 6, wherein said first clutch control module, after decreasing said first pressure at said predetermined pressure rate, steps said first pressure up to a measured pressure of said fluid at a time when said turbine speed stall was detected.

8. A control system for an automatic transmission coupled to an engine by a torque converter, comprising:
   a torque module that determines an input torque to said transmission based on an output torque of said engine;
   a first clutch control module that adjusts an acceleration of a turbine of said torque converter during a down shift of said transmission by adjusting a first pressure of fluid supplied to an off-going clutch of said transmission based on said input torque; and
   a second clutch control module that increases a rate at which a second pressure of fluid supplied to an on-coming clutch of said transmission is increased during said down shift from a predetermined first rate to a predetermined second rate greater than said predetermined first rate, wherein said predetermined first rate is based on said input torque.

9. The control system of claim 8, wherein when turbine flare is detected, said second clutch control module adjusts said rate by a predetermined amount.

10. A method for operating an automatic transmission coupled to an engine by a torque converter, comprising:
    determining an input torque to said transmission based on an output torque of said engine; and
    adjusting an acceleration of a turbine of said torque converter during a down shift of said transmission by adjusting a first pressure of fluid supplied to an off-going clutch of said transmission based on said input torque,
    wherein said adjusting said acceleration includes adjusting said first pressure based on a mathematical model that relates a torque capacity of said off-going clutch, said input torque, and said acceleration, said mathematical model being embodied in one of an equation and a lookup table stored in a memory module.

11. The method of claim 10, wherein said adjusting said acceleration includes decelerating said turbine by increasing said first pressure.

12. A method for operating an automatic transmission coupled to an engine by a torque converter, comprising:
    determining an input torque to said transmission based on an output torque of said engine; and
    adjusting an acceleration of a turbine of said torque converter during a down shift of said transmission by adjusting a first pressure of fluid supplied to an off-going clutch of said transmission based on said input torque
    wherein said input torque is a compensated input torque based on at least one of an engine speed, a turbine speed, and a torque ratio of said torque converter.

13. The method of claim 12, further comprising:
    beginning a first control stage in response to a request for said down shift;

initiating off-going clutch slip during said first control stage by decreasing said first pressure;

ending said first control stage when one of said off-going clutch slip is detected and an elapsed time of said first control stage is greater than a predetermined first period; and beginning a second control stage at an end of said first control stage, wherein said adjusting said acceleration is performed during said second control stage.

14. The method of claim 13, wherein said initiating said off-going clutch slip includes limiting a rate of change in said first pressure.

15. A method for operating an automatic transmission coupled to an engine by a torque converter, comprising:

determining an input torque to said transmission based on an output torque of said engine; and adjusting an acceleration of a turbine of said torque converter during a down shift of said transmission by adjusting a first pressure of fluid supplied to an off-going clutch of said transmission based on said input torque, wherein said adjusting said acceleration includes:

stepping said first pressure down by a predetermined pressure when turbine speed stall is detected; and decreasing said first pressure at a predetermined pressure rate after said stepping said first pressure down.

16. The method of claim 15, wherein said adjusting said acceleration further includes stepping said first pressure up to a measured pressure of said fluid at a time when said turbine speed stall was detected after said decreasing said first pressure.

17. A method for operating an automatic transmission coupled to an engine by a torque converter, comprising:

determining an input torque to said transmission based on an output torque of said engine;

adjusting an acceleration of a turbine of said torque converter during a down shift of said transmission by adjusting a first pressure of fluid supplied to an off-going clutch of said transmission based on said input torque; and increasing a second pressure of fluid supplied to an oncoming clutch of said transmission during said down shift, wherein said increasing said second pressure includes increasing a rate at which said second pressure is increased from a predetermined first rate to a predetermined second rate greater than said predetermined first rate, and wherein said predetermined first rate is based on said input torque.

18. The method of claim 17, wherein said increasing said second pressure further includes adjusting said rate by a predetermined amount when turbine flare is detected.

* * * * *